(12) United States Patent
Oishi et al.

(10) Patent No.: US 9,017,491 B2
(45) Date of Patent: Apr. 28, 2015

(54) HOT-FORGED COPPER ALLOY PART

(71) Applicant: Mitsubishi Shindoh Co., Ltd., Tokyo (JP)

(72) Inventors: Keiichiro Oishi, Osaka (JP); Takayuki Oka, Osaka (JP); Shin Oikawa, Osaka (JP)

(73) Assignee: Mitsubishi Shindoh Co., Ltd., Tokyo (JP)

( * ) Notice: Subject to any disclaimer, the term of this patent is extended or adjusted under 35 U.S.C. 154(b) by 0 days.

(21) Appl. No.: 14/355,420

(22) PCT Filed: Nov. 2, 2012

(86) PCT No.: PCT/JP2012/078508
§ 371 (c)(1),
(2) Date: Apr. 30, 2014

(87) PCT Pub. No.: WO2013/065830
PCT Pub. Date: May 10, 2013

(65) Prior Publication Data
US 2014/0251488 A1    Sep. 11, 2014

(30) Foreign Application Priority Data

Nov. 4, 2011  (JP) ................. 2011-242413

(51) Int. Cl.
| | |
|---|---|
| *C22C 9/04* | (2006.01) |
| *C22F 1/08* | (2006.01) |
| *F16L 9/02* | (2006.01) |

(52) U.S. Cl.
CPC ... *C22C 9/04* (2013.01); *C22F 1/08* (2013.01); *F16L 9/02* (2013.01)

(58) Field of Classification Search
USPC ............ 420/471–482, 484; 148/434; 138/177
See application file for complete search history.

(56) References Cited

U.S. PATENT DOCUMENTS

2007/0169855 A1    7/2007  Oishi

FOREIGN PATENT DOCUMENTS

| | | |
|---|---|---|
| JP | 62-093331 A | 4/1987 |
| JP | 2000-119774 A1 | 4/2000 |
| JP | 2001-089835 A | 4/2001 |
| JP | 2002-012928 A | 1/2002 |
| JP | 2009-007673 A | 1/2009 |
| TW | 201107500 A | 3/2011 |
| TW | 201107501 A | 3/2011 |
| WO | 2006016442 A1 | 2/2006 |

OTHER PUBLICATIONS

Office Action issued in co-pending Taiwanese application 101140817 on Jun. 11, 2014.
Office Action issued in co-pending Japanese application 2013-51045 on Jul. 16, 2013.
International Search Report issued in corresponding application PCT/JP2012/078508, completed Jan. 21, 2013 and mailed Jan. 29, 2013.

*Primary Examiner* — Roy King
*Assistant Examiner* — Caitlin Kiechle
(74) *Attorney, Agent, or Firm* — Griffin & Szipl, P.C.

(57) ABSTRACT

A hot-forged copper alloy part which has a tubular shape, in which an alloy composition contains 59.0 mass % to 84.0 mass % of Cu and 0.003 mass % to 0.3 mass % of Pb with a remainder of Zn and inevitable impurities, a content of Cu [Cu] mass % and a content of Pb [Pb] mass % have a relationship of $59 \leq ([Cu]+0.5\times[Pb]) \leq 64$, a shape of the forged part satisfies a formula of $0.4 \leq$ (average inner diameter)/(average outer diameter)$\leq 0.92$, $0.04 \leq$ (average thickness)/(average outer diameter)$\leq 0.3$, and $1 \leq$ (tube axis direction length)/(average thickness)$) \leq 10$, a forging material which is to be hot-forged has a tubular shape and satisfies $0.3 \leq$ (average inner diameter/average outer diameter)$\leq 0.88$, $0.06 \leq$ (average thickness)/(average outer diameter)$\leq 0.35$, and $0.8 \leq$ (tube axis direction length)/(average thickness)$) \leq 12$, and $0\% \leq$ (degree of uneven thickness)$\leq 30\%$, $0 \leq$ (degree of uneven thickness)$\leq 75 \times 1/((\text{tube axis direction length})/(\text{average thickness}))^{1/2}$ in any location in a tube axis direction.

36 Claims, 3 Drawing Sheets

HOT-FORGED COPPER ALLOY PART

This is a National Phase Application in the United States of International Patent Application No. PCT/JP2012/078508 filed Nov. 2, 2012, which claims priority on Japanese Patent Application No. 2011-242413, filed Nov. 4, 2011. The entire disclosures of the above patent applications are hereby incorporated by reference.

TECHNICAL FIELD

The present invention relates to a hot-forged copper alloy part, and, particularly to a hot-forged copper alloy part which has a tubular shape and is excellent in terms of moldability, corrosion resistance, strength and machinability.

Priority is claimed on Japanese Patent Application No. 2011-242413, filed Nov. 4, 2011, the content of which is incorporated herein by reference.

BACKGROUND ART

Generally, hot-forged copper alloy parts are excellent in terms of hot forgeability, machinability, antibacterial properties and bactericidal properties, have high strength, favorable corrosion resistance and favorable conductivity, and are thus used for a variety of industrial machinery and facilities, mechanical parts in automobiles, and electric components. In addition, hot-forged copper alloy parts are used for members such as valves, ball valves, joints, joints and connection tools for crosslinked polyethylene tubes, tube joints and connection tools for crosslinked polybutene tubes, connection tools for water supply and drainage, hose nipples, connection tools for gardening hoses, connection tools for gas hoses, lids for water meters, water faucets, hydraulic containers, nozzles, sprinklers, flare nuts, nuts, water supply and hot-water supply facilities, air-conditioning facilities, containers, connection tools and devices for fire protection facilities and gas facilities, containers and devices through which water, warm water, refrigerants, air, town gas and propane gas pass, and the like.

Particularly, copper alloys have favorable strength, corrosion resistance, antibacterial properties and bactericidal properties, and are thus widely used for potable water-related members. However, since joints, connection tools, faucets and the like, which are potable water-related members, are tubular bodies having a hole portion to allow potable water to pass through, while copper alloys have excellent hot workability and excellent hot forgeability, with techniques of the related art, a copper alloy can be made only into a shape that is far from a near net shape (a shape close to a complete shape), there are problems in that a number of burrs and the like are caused such that the forging yield rate decreases, the cut amount after hot forging is large, and, sometimes, the corrosion resistance or the strength decreases since copper alloys are forged at a high temperature.

The above-described hot-forged copper alloy refers to a body obtained by melting a raw material, casting the raw material into an ingot, cutting a hot-extruded round rod into a predetermined length, then, hot-forging the round rod, and cutting the hot-forged material into predetermined dimensions. Examples of a material for the rod material are mainly based on JIS H 3250, and include forging brass rod C3771 (typical composition: 59Cu-2Pb—Zn(remainder)) that is excellent in terms of hot forgeability and machinability and copper alloy materials obtained by substituting Pb in C3771 with Bi in order to satisfy a recent requirement of the removal of Pb. Particularly, in a case in which excellent dezincification corrosion resistance is required, a forging brass rod which has an increased copper concentration in a range of 61 mass % to 63 mass %, contains 0.5% to 2.5% of Pb, and has dezincification corrosion resistance, and a forging brass rod which is obtained by substituting Pb in the above-described forging brass rod with Bi and has dezincification corrosion resistance are used.

However, when a round rod material is hot-forged as in techniques of the related art, naturally, it is not possible or at least not easy to make the round rod material into a tubular shape, that is, to make a hole portion. In addition, even when attempts are made to decrease the thickness of a portion in which a hole is to be formed in order to increase the forging yield rate, there is a limitation due to a forging load. Furthermore, since a large proportion of deformation energy being added to a forging material is consumed for the molding of the hole portion, it is not possible to mold the shapes of portions other than the hole portion into a predetermined shape. Particularly, in a case in which a forged part has a large aperture (hole diameter or inner diameter), a large outer diameter, and a small thickness, it is difficult to mold a forging material into the near net shape. While a forging facility having a large forging capacity can somewhat decrease the thickness of a portion in which a hole is to be formed and the thickness of a thick portion, there is a limitation in decreasing the thickness. In addition, it is needless to say that the forging facility having a large forging capacity is expensive, and the energy cost for forging further increases since it is necessary to increase the power. In a case in which it is not possible to mold a forging material into a predetermined shape, since the amount of a material being used increases, the material cost significantly increases, and, at the same time, the cut amount increases, the material needs to have improved machinability, and a necessary time for a cutting process also increases.

Hitherto, there have been cases in which the above-described forged copper alloy part having a hole portion is produced using cast metal from the viewpoint of the yield rate. However, there are problems in that cast metal includes a number of defects, has a poor dimensional accuracy, low strength, poor ductility and poor productivity, and is produced in a poor working environment.

Due to what has been described above, there is a demand for a hot-forged copper alloy having a hole portion, that is, a tubular hot-forged copper alloy which can decrease energy consumption by using a low power forging facility that does not require a large amount of facility cost, has a favorable forging yield rate, that is, does not require a large amount of material cost, and has a near net shape that is close to the final finished shape and dimensions.

Regarding the material, in a case in which a finished product is produced using a hollow member, that is, a tubular member through an ordinary hot forging method, it is not possible to mold the member into the near net shape as described above. That is, since it is not possible to make a hollow portion, and portions other than the hollow portion can be molded only into dimensions larger than the predetermined dimensions, the cut amount for achieving the shape of the finished product increases. As a result, as forging materials, there is a demand for a copper alloy having excellent machinability. In order to improve the machinability of the copper alloy, generally, Pb is added, and at least 0.5 mass %, often, 1 mass % or more, and approximately 2 mass % of Pb is added. However, since Pb is harmful, particularly in potable water-related members, the content of Pb is preferably set to 0.3 mass % or 0.2 mass % or less, and it is necessary to suppress the amount of Pb to an extremely small extent. It is needless to say that, when global environmental issues are taken into account, it is also necessary to suppress the use of harmful Pb to an extremely small extent in forged parts being used in potable water-irrelevant fields.

However, since Pb which has a machinability-improving function rarely forms a solid solution in copper alloys, when the hot forging temperature is outside the optimal temperature range, copper alloys are easily cracked during forging. While there is a hot forging copper alloy in which Pb is substituted with Bi, the copper alloy is intended to improve the machinability of copper alloys, and, since Bi is slightly inferior to Pb in term of the improvement of the machinability of copper alloys, a larger amount of Bi is required. Bi-containing copper alloys are more sensitive to cracking during hot forging than Pb-containing copper alloys, and thus there is a problem in that Bi-containing copper alloys have poor hot deformability. Therefore, in the case of Bi-containing copper alloys, it is necessary to set the temperature of hot forging in a narrow range or to increase the thickness of forged parts. In addition, there are problems in that Bi-containing forged parts have poor ductility and low toughness, and the forged parts become embrittled at a temperature in a range of 130° C. to 300° C.

Furthermore, when a hot forging brass rod which has a Cu concentration in a range of 57 mass % to 59 mass % and contains Pb or Bi is hot-forged, a large amount of β phase remains in a forged part, and the corrosion resistance is poor. In Cu—Zn—Pb or Cu—Zn—Bi alloys which have a Cu concentration set to approximately 61 mass % or more and have improved corrosion resistance, when hot deformation resistance increases, the hot deformability deteriorates at the same time. When the copper concentration is high, it is difficult to produce forged parts having the near net shape, the shape of forged parts become complicated, and the moldability and cracking become serious issues as the thickness decreases.

There is a desperate demand for the production of hollow hot-forged copper alloys having the near net shape that is close to the final finished shape and dimensions in which a copper alloy is hot-forged in a single process using a low power forging facility so as to decrease energy consumption, and the cost is reduced by preventing the occurrence of cracking during hot forging, increasing the forging yield ratio, and decreasing the amount of materials being used. When it is possible to mold a copper alloy into the near net shape, the cutting amount decreases, and therefore excellent machinability is not required, that is, it is possible to suppress the content of harmful Pb or Bi having an uncertain stability to become the minimum. Furthermore, there is another desperate demand for a tubular forged part which has excellent corrosion resistance and high strength so as to be further downsized.

In addition, forged brass parts which are intended to improve corrosion resistance, machinability and productivity are known (for example, refer to Patent Document 1). However, in the forged brass parts, it is not possible to forge tubular forged parts into the near net shape.

RELATED ART DOCUMENT

Patent Document

[Patent Document 1] Japanese Unexamined Patent Application Publication No. 2002-12928

DISCLOSURE OF THE INVENTION

Problem that the Invention is to Solve

The invention has been made to solve the above-described problems of the related art, and an object of the invention is to provide a tubular hot-forged copper alloy part that is excellent in terms of moldability, corrosion resistance, strength and machinability.

Means for Solving the Problems

In order to solve the above-described problems, the invention has the following aspects.

[1] A hot-forged copper alloy part which has a tubular shape, in which an alloy composition contains 59.0 mass % to 84.0 mass % of Cu and 0.003 mass % to 0.3 mass % of Pb with a remainder of Zn and inevitable impurities, a content of Cu [Cu] mass % and a content of Pb [Pb] mass % have a relationship of $59 \leq ([Cu]+0.5\times[Pb]) \leq 64$, a shape of the forged part satisfies a formula of $0.4 \leq$ (average inner diameter)/(average outer diameter)$\leq 0.92$, $0.04 \leq$ (average thickness)/(average outer diameter)$\leq 0.3$, and $1 \leq$ (tube axis direction length)/(average thickness)$\leq 10$, and a forging material which is to be hot-forged has a tubular shape and satisfies $0.3 \leq$ (average inner diameter/average outer diameter)$\leq 0.88$, $0.06 \leq$ (average thickness)/(average outer diameter)$\leq 0.35$, and $0.8 \leq$ (tube axis direction length)/(average thickness)$\leq 12$, and $0\% \leq$ (degree of uneven thickness)$\leq 30\%$, $0 \leq$ (degree of uneven thickness)$\leq 75 \times 1/((\text{tube axis direction length})/(\text{average thickness}))^{1/2}$ in any location in a tube axis direction.

In the invention, so-called ring-shaped hot-forged copper alloy parts and forging materials which have a length in the tube axis direction shorter than an outer diameter of the tube are also considered as the tubular hot-forged copper alloy part and the forging material. A hollow portion in the tubular hot-forged copper alloy part and the forging material tube is called the hole portion.

The degree of uneven thickness is defined as $((1-(\text{minimum thickness})/(\text{maximum thickness})\times100)$ % using the minimum thickness and the maximum thickness in a cross-section perpendicular to the tube axis direction of the forging material.

The hot-forged copper alloy part according to the above aspect [1] has a low deformation resistance of hot forging, excellent deformability, excellent moldability, excellent corrosion resistance, high strength, and favorable machinability.

[2] A hot-forged copper alloy part which has a tubular shape, in which an alloy composition contains 59.0 mass % to 84.0 mass % of Cu, 0.003 mass % to 0.3 mass % of Pb and 0.05 mass % to 4.5 mass % of Si with a remainder of Zn and inevitable impurities, a content of Cu [Cu] mass %, a content of Pb [Pb] mass % and a content of Si [Si] mass % have a relationship of $59 \leq ([Cu]+0.5\times[Pb]-4.5\times[Si]) \leq 64$, a shape of the forged part satisfies a formula of $0.4 \leq$ (average inner diameter)/(average outer diameter)$\leq 0.92$, $0.04 \leq$ (average thickness)/(average outer diameter)$\leq 0.3$, and $1 \leq$ (tube axis direction length)/(average thickness)$\leq 10$, and a forging material which is to be hot-forged has a tubular shape and satisfies $0.3 \leq$ (average inner diameter/average outer diameter)$\leq 0.88$, $0.06 \leq$ (average thickness)/(average outer diameter)$\leq 0.35$, and $0.8 \leq$ (tube axis direction length)/(average thickness)$\leq 12$, and $0\% \leq$ (degree of uneven thickness)$\leq 30\%$, $0 \leq$ (degree of uneven thickness)$\leq 75 \times 1/((\text{tube axis direction length})/(\text{average thickness}))^{1/2}$ in any location in a tube axis direction.

The hot-forged copper alloy part according to the above aspect [2] contains Si, and is thus excellent in terms of moldability, corrosion resistance, strength and machinability in addition to the effects of the aspect [1].

[3] A hot-forged copper alloy part which has a tubular shape, in which an alloy composition contains 73.0 mass % to 84.0 mass % of Cu, 0.003 mass % to 0.3 mass % of Pb and 2.5 mass % to 4.5 mass % of Si with a remainder of Zn and inevitable impurities, a content of Cu [Cu] mass %, a content of Pb [Pb] mass % and a content of Si [Si] mass % have a relationship of $59 \leq ([Cu]+0.5\times[Pb]-4.5\times[Si]) \leq 64$, a shape of the forged part satisfies a formula of $0.4 \leq$(average inner diameter)/(average outer diameter)$\leq 0.92$, $0.04 \leq$(average thickness)/(average outer diameter)$\leq 0.3$, and $1 \leq$(tube axis direction length)/(average thickness))$\leq 10$, and a forging material which is to be hot-forged has a tubular shape and satisfies $0.3 \leq$(average inner diameter/average outer diameter)$\leq 0.88$, $0.06 \leq$(average thickness)/(average outer diameter)$\leq 0.35$, and $0.8 \leq$(tube axis direction length)/(average thickness))$\leq 12$, and $0\% \leq$(degree of uneven thickness)$\leq 30\%$, $0 \leq$(degree of uneven thickness)$\leq 75 \times 1/((\text{tube axis direction length})/(\text{average thickness}))^{1/2}$ in any location in a tube axis direction.

The hot-forged copper alloy part according to the above aspect [3] contains a larger amount of Cu and a larger amount of Si, and is thus excellent in terms of corrosion resistance, strength and machinability in addition to the effects of the aspect [1].

[4] The hot-forged copper alloy part which has a tubular shape according to any one of the above aspects [1] to [3], in which the tubular hot-forged copper alloy part further contains at least one of 0.01 mass % to 0.3 mass % of As, 0.01 mass % to 0.3 mass % of Sb, 0.01 mass % to 0.3 mass % of P, 0.01 mass % to 0.3 mass % of Mg, 0.01 mass % to 1.5 mass % of Sn, 0.01 mass % to 1.0 mass % of Al, 0.01 mass % to 4.0 mass % of Mn, 0.01 mass % to 4.0 mass % of Ni, 0.0005 mass % to 0.05 mass % of Zr, 0.0005 mass % to 0.05 mass % of B and 0.003 mass % to 0.3 mass % of Bi, and a content of Cu [Cu] mass %, a content of Pb [Pb] mass %, a content of Si [Si] mass %, a content of Ni [Ni] mass %, a content of Mn [Mn] mass %, a content of As [As] mass %, a content of Zr [Zr] mass %, a content of B [B] mass %, a content of Bi [Bi] mass %, a content of Sb [Sb] mass %, a content of Sn [Sn] mass %, a content of Mg [Mg] mass %, a content of Al [Al] mass % and a content of P [P] mass % have a relationship of $59 \leq ([Cu]+0.5\times[Pb]-4.5\times[Si]+2.2\times[Ni]+1.4\times[Mn]+0.5\times([As]+[Zr]+[B]+[Bi])-1.2\times([Sb]+[Sn]+[Mg])-2.2\times[Al]-3\times[P]) \leq 64$.

In this case, the hot-forged copper alloy part contains As and the like, and is thus, furthermore, excellent in terms of corrosion resistance, strength and machinability.

[5] The hot-forged copper alloy part which has a tubular shape according to any one of the above aspects [1] to [4], in which, in a metal structure at room temperature after the hot forging, an area ratio of α phase is in a range of 30% to less than 100%, and a sum of an area ratio of β phase, an area ratio of γ phase and an area ratio of μ phase is in a range of 0% to 25%.

The area ratio of each of the phases refers to an area ratio at a location in the metal structure which is 5 mm or more inside from an end surface in the tube axis direction and ¼ or more of a thickness inside from both an outer circumferential surface and an inner circumferential surface.

[6] The hot-forged copper alloy part which has a tubular shape according to any one of the above aspects [1] to [4], in which the tubular hot-forged copper alloy part is manufactured by heating the forging material to a hot forging temperature so as to be hot-forged, the hot forging temperature is in a range of 650° C. to 800° C., and the area ratio of the α phase in the metal structure of the forging material at the hot forging temperature is in a range of 3% to 60%.

[7] The hot-forged copper alloy part which has a tubular shape according to any one of the above aspects [1] to [4], in which, when the forging material is heated at 720° C., the area ratio of the α phase in the metal structure is in a range of 3% to 60%.

[8] The hot-forged copper alloy part which has a tubular shape according to any one of the above aspects [1] to [4], in which the forging material is a continuous cast tube.

[9] The hot-forged copper alloy part which has a tubular shape according to any one of the above aspects [1] to [4], in which the tubular hot-forged copper alloy part is used for valves, ball valves, joints, joints and connection tools for crosslinked polyethylene tubes, tube joints and connection tools for crosslinked polybutene tubes, connection tools for water supply and drainage, hose nipples, connection tools for a variety of hoses, valves, caps, lids, lids for water meters, joints, water faucets, hydraulic containers, nozzles, sprinklers, flare nuts, nuts, water supply and hot-water supply facilities, air-conditioning facilities, containers, connection tools and devices for fire protection facilities and gas facilities, containers and devices through which liquid such as water or gas such as air passes.

Advantage of the Invention

According to the invention, the tubular hot-forged copper alloy part is excellent in terms of moldability, corrosion resistance, strength and machinability.

BEST MODE FOR CARRYING OUT THE INVENTION

Figure 1:
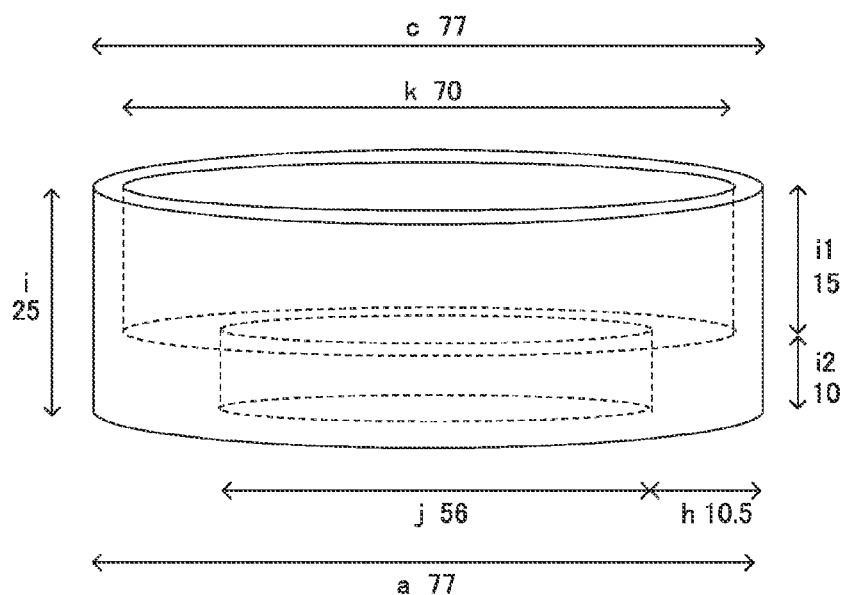
FIG. 1 is a view illustrating a target shape of a forged part in hot forging.

A hot-forged copper alloy part according to an embodiment of the invention will be described.

As a copper alloy according to the invention, first to fourth invention alloys are proposed. In the present specification, in order to express alloy compositions, an element sign in a parenthesis, such as [Cu], represents the content value (mass %) of the element. In the specification, a plurality of computation formulae will be proposed using the above-described method for representing content values; however, in the respective computation formulae, for elements that are not contained, Pb having a content of less than 0.003 mass %, Si having a content of less than 0.05 mass %, other elements which are selectively contained in the present application and have a smaller content than the lower limit in the claims, and impurities, the contents of the elements are considered to be zero in computation. The first to fourth invention alloys will be collectively called the invention alloy.

The first invention alloy has an alloy composition that contains 59.0 mass % to 84.0 mass % of Cu and 0.003 mass % to 0.3 mass % of Pb with a remainder of Zn and inevitable impurities, and the content of Cu [Cu] mass % and the content of Pb [Pb] mass % have a relationship of $59 \leq ([Cu]+0.5\times[Pb]) \leq 64$.

In the specification, a value represented by the formula ([Cu]+0.5×[Pb]) will be called a first composition coefficient.

The second invention alloy has an alloy composition that contains 59.0 mass % to 84.0 mass % of Cu, 0.003 mass % to 0.3 mass % of Pb and 0.05 mass % to 4.5 mass % of Si with a remainder of Zn and inevitable impurities, and the content of Cu [Cu] mass %, the content of Pb [Pb] mass % and the content of Si [Si] mass % have a relationship of 59≤([Cu]+0.5×[Pb]−4.5×[Si])≤64.

In the specification, a value represented by the formula ([Cu]+0.5×[Pb]−4.5×[Si]) will be called a second composition coefficient.

The third invention alloy has an alloy composition that contains 73.0 mass % to 84.0 mass % of Cu, 0.003 mass % to 0.3 mass % of Pb and 2.5 mass % to 4.5 mass % of Si with a remainder of Zn and inevitable impurities, and the content of Cu [Cu] mass %, the content of Pb [Pb] mass % and the content of Si [Si] mass % have a relationship of 59≤([Cu]+0.5×[Pb]−4.5×[Si])≤64.

The fourth invention alloy has the same composition ranges of Cu, Pb and Si as any one of the first invention alloy to the third invention alloy, further contains at least one of 0.01 mass % to 0.3 mass % of As, 0.01 mass % to 0.3 mass % of Sb, 0.01 mass % to 0.3 mass % of P, 0.01 mass % to 0.3 mass % of Mg, 0.01 mass % to 1.5 mass % of Sn, 0.01 mass % to 1.0 mass % of Al, 0.01 mass % to 4.0 mass % of Mn, 0.01 mass % to 4.0 mass % of Ni, 0.0005 mass % to 0.05 mass % of Zr, 0.0005 mass % to 0.05 mass % of B and 0.003 mass % to 0.3 mass % of Bi, and the content of Cu [Cu] mass %, the content of Pb [Pb] mass %, the content of Si [Si] mass %, the content of Ni [Ni] mass %, the content of Mn [Mn] mass %, the content of As [As] mass %, the content of Zr [Zr] mass %, the content of B [B] mass %, the content of Bi [Bi] mass %, the content of Sb [Sb] mass %, the content of Sn [Sn] mass %, the content of Mg [Mg] mass %, the content of Al [Al] mass % and the content of P [P] mass % have a relationship of 59≤([Cu]+0.5×[Pb]−4.5×[Si]+2.2×[Ni]+1.4×[Mn]+0.5×([As]+[Zr]+[B]+[Bi])−1.2×([Sb]+[Sn]+[Mg])−2.2×[Al]−3×[P])≤64.

In the specification, a value represented by the formula ([Cu]+0.5×[Pb]−4.5×[Si]+2.2×[Ni]+1.4×[Mn]+0.5×([As]+[Zr]+[B]+[Bi])−1.2×([Sb]+[Sn]+[Mg])−2.2×[Al]−3×[P]) will be called a fourth composition coefficient.

The above-described first composition coefficient, second composition coefficient and fourth composition coefficient will be collectively called the composition coefficient. In the computation of the composition coefficient, inevitable impurities and elements, except for Cu, which have a content that is smaller than the lower limit in the claims, specifically, 0.003 mass % for Pb, 0.05 mass % for Si, 0.01 mass % for As, 0.01 mass % for Sb, 0.01 mass % for P, 0.01 mass % for Mg, 0.01 mass % for Sn, 0.01 mass % for Al, 0.01 mass % for Mn, 0.01 mass % for Ni, 0.0005 mass % for Zr, 0.0005 mass % for B and 0.003 mass % for Bi, do not have any influence on the composition formulae, and therefore the coefficients will be considered to be zero in the computation.

Next, a process for manufacturing the hot-forged copper alloy part according to the invention will be described.

The hot-forged copper alloy part is manufactured by hot-forging a heated forging material.

A tubular forging material may be manufactured using any process, and examples thereof include a cast material, an extruded material, a rolled material and a forged material, and a tubular continuous cast tube is desirable. The continuous cast tube is, sometimes, called a void continuous cast rod or a hollow continuous cast rod. For example, since the shape needs to be tubular in order to allow potable water to flow through, the forged part has a tubular shape, which means that the forged part is the same as a hollow forged part or a void forged part.

The hot forging temperature is in a range of 650° C. to 800° C.

After hot forging, the hot-forged part is cooled at an average cooling rate in a range of 0.1° C./second to 60° C./second in a temperature range of the temperature of the hot-forged part when the forging ends to 300° C. or in a temperature range of 650° to 300°.

While the hot-forged copper alloy part has a shape that is tubular and satisfies 0.4≤(average inner diameter)/(average outer diameter)≤0.92, 0.04≤(average thickness)/(average outer diameter)≤0.3, and 1≤(tube axis direction length)/(average thickness))≤10, the forging material has a tubular shape and satisfies 0.3≤(average inner diameter/average outer diameter)≤0.88, 0.06≤(average thickness)/(average outer diameter)≤0.35, 0.8≤(tube axis direction length)/(average thickness))≤12, 0%≤(degree of uneven thickness)≤30% and 0≤(degree of uneven thickness)≤75×1/((tube axis direction length)/(average thickness))$^{1/2}$.

Next, the reasons for adding the respective elements will be described.

Cu is a principal element that configures the invention alloy. While significantly influenced by a relationship with Pb, Si, Zn and the like, in order to provide the invention alloy with favorable hot forgeability and favorable moldability and to provide the invention alloy with high strength, favorable ductility, and excellent corrosion resistance after hot forging, the content of Cu needs to be 59.0 mass % or more. In a case in which superior corrosion resistance and superior ductility are required, the content of Cu is preferably 60.5 mass % or more. On the other hand, when more than 84.0 mass % of Cu is contained, regardless of the contents of Si, Zn, Pb and the like, the deformation resistance during hot forging and the deformation resistance during forging at a temperature lower than the hot temperature become large, and the deformability and the moldability deteriorate. Regarding the characteristics as well, the machinability deteriorates, the strength decreases, and the corrosion resistance is also saturated. Cu is expensive and thus has an economic problem. In a case in which 2.5 mass % or more of Si described below is contained, the content of Cu needs to be 73.0 mass % or more to ensure excellent corrosion resistance, excellent ductility and high strength.

Pb is contained to improve the machinability. In order to improve the machinability, the content of Pb needs to be 0.003 mass % or more. A content of 0.002 mass % is almost equivalent to an amount necessary for Pb to form a solid solution in a Cu—Zn alloy, and, when the content of Pb is 0.003 mass % or more, Pb is present in the metal structure in a form of Pb particles, and therefore an effect that improves the machinability is exhibited. The content of Pb is more preferably 0.005 mass % or more. On the other hand, when more than 0.3 mass % of Pb is contained, particularly, in a case in which the part of the invention is used in potable water devices or the like, there is a concern that human bodies may be adversely influenced. Since the elution of Pb into potable water from a potable water device made of a copper alloy increases as the amount of Pb contained in the device increases, it is necessary to suppress the content of Pb to be the minimum. In a case in which the part of the invention is used in other fields as well, when the hot-forged part is disposed as a waste, there is a probability that a significant influence may be given to environmental issues in the future. When κ phase and γ phase are formed in the metal structure due to the inclusion of Pb that is present in a particle form and Si described below or Sn, it is possible to further improve the machinability. In consideration of the influence on human bodies, the content of Pb is preferably 0.2 mass % or less, more preferably 0.1 mass % or less, and optimally 0.05 mass % or less.

While significantly influenced by the contents of Cu and Zn, and a relationship between the elements, Si improves the hot forgeability, that is, the deformability during hot forging, decreases the deformation resistance, and improves the fluidity and the moldability of a material during hot forging. In a case in which a tubular forging material has a 20% to 30% uneven thickness as well, Si is required to make the material uniformly flow. Si increases the strength of the forged part after hot forging, and improves the machinability and the corrosion resistance. In order to obtain the above-described characteristics, the content of Si needs to be 0.05 mass % or more, and preferably 0.2 mass % or more. Particularly, when 2.5 mass %, preferably, 2.7 mass % or more of Si is contained, it is possible to provide higher strength, superior machinability and superior corrosion resistance. On the other hand, when more than 4.5 mass % of Si is contained, the deformation resistance during hot processing increases, the hot deformability also deteriorates, and the corrosion resistance and the machinability are saturated as well. The content of Si is preferably 4.3 mass % or less, and optimally 3.9 mass % or less. According to the content of Si, the above-described preferable range of the content of Cu also changes. In a case in which the content of Si is 2.7 mass % or more, the content of Cu is preferably 74.0 mass % or more; in a case in which the content of Si is 4.3 mass % or less, the content of Cu is preferably 83 mass % or less; in a case in which the content of Si is 3.9 mass % or less, the content of Cu is preferably 80 mass % or less. When Cu and Si are in the preferable composition ranges, since the proportion of the β phase and the κ phase which decrease the deformation resistance during hot forging increases, and the majority of the β phase transforms into α phase or the κ phase during cooling after forging, the corrosion resistance, the strength and the machinability are excellent.

With Cu—Zn—Pb alloys and, furthermore, Cu—Zn—Pb—Si alloys, the initial object of the application is achieved; however, when superior corrosion resistance, strength and machinability are required, it is effective for P, Sb, As, Al, Sn, Mg, Zr, B, Mn, Ni and Bi to be contained. Sn and Al improve corrosion resistance in flowing water. Mg improves grain boundary corrosion resistance. Si, Mn, Ni, Al and Sn improve strength and wear resistance. The β phase formed in Cu—Zn—Pb alloys has an effect that improves machinability, and each of the γ, κ, β and μ phases which contain Si, Sn, Al and the like has an effect that improves strength, wear resistance, corrosion resistance and machinability. Particularly, in the latter alloys, since the above-described additional elements are preferentially distributed in the γ phase, the κ phase and the like, the concentration of the additional elements increases, the properties and characteristics of the γ phase, the κ phase and the like become favorable, and the wear resistance, the strength, the corrosion resistance or the machinability are improved. In a case in which a hollow continuous cast rod is used as the material, Zr, P, B and Mg have an effect that miniaturizes crystal grains, decrease the deformation resistance during hot forging, and improves the deformability and the moldability. Particularly, the addition of Zr and P, and, furthermore, Mg at the same time has an effect that significantly miniaturizes crystal grains, and, when the content of P is larger than the content of Zr, the effect becomes significant. The size of crystal grains at this time becomes 300 μm or less or 200 μm or less. The inclusion of Bi improves machinability.

Regarding corrosion resistance, when a dezincification corrosion test is carried out based on ISO-6509, a maximum corrosion depth of 600 μm or less is the minimum requirement to have favorable corrosion resistance. The maximum corrosion depth is preferably 400 μm or less, more preferably 200 μm or less, still more preferably 100 μm or less, and optimally 50 μm or less. When the maximum corrosion depth is 400 μm or less or 200 μm or less, it is considered that there is no practical problem in terms of corrosion resistance. Regarding strength, since the subject of the application is a hot-forged part, tensile strength cannot be measured, but hardness can be used as an acceptable alternative. The hardness is preferably 70 or more, more preferably 85 or more, and still more preferably 95 or more in terms of Vickers hardness. Since the forming material can be molded into a thinner shape using the near net shape forging of the application, it is optimal to obtain a high strength of 110 or more. In the invention alloy, a Vickers hardness of 95 is a high tensile strength that is equivalent to approximately 400 N/mm$^2$. Since wear resistance depends on hardness, wear resistance becomes more favorable as the hardness index increases.

In order to more effectively exhibit the above-described excellent corrosion resistance, high strength, excellent wear resistance and favorable machinability, at least one of 0.01 mass % to 0.2 mass % of As, 0.01 mass % to 0.2 mass % of Sb, 0.01 mass % to 0.2 mass % of P, 0.01 mass % to 0.2 mass % of Mg, 0.01 mass % to 1.5 mass % of Sn, 0.01 mass % to 1.0 mass % of Al, 0.1 mass % to 4 mass % of Mn, 0.1 mass % to 4 mass % of Ni, 0.001 mass % to 0.04 mass % of Zr, 0.001 mass % to 0.04 mass % of B and 0.003 mass % to 0.3 mass % of Bi are required, and are appropriately and selectively contained depending on required characteristics. When the contents of P, Sb, As, Al, Sn, Mg, Zr, Mn and Ni exceed the upper limits, the effects of all the elements regarding the various characteristics are saturated, conversely, the deformation resistance during forging increases or the deformability deteriorates, and the ductility at room temperature is impaired. When Sb and As exceed the upper limits, human bodies are adversely influenced. Similarly to Pb, as the content of Bi increases, the machinability improves. However, there is a concern that Bi may adversely influence human bodies, Bi is a rare metal, and Bi degrades the deformability and the moldability during hot forging. Therefore, in consideration of what has been described above, the upper limit of the content of Bi is determined depending on the degree of necessary machinability. The content of Bi is preferably 0.2 mass % or less, and more preferably 0.1 mass % or less.

Next, other impurities will be described. Since copper alloys have excellent recyclability, are collected and recycled at a high recycling rate, other copper alloys are incorporated during recycling. For example, during cutting, Fe, Cr and the like are inevitably incorporated due to the wear of tools. Therefore, to elements regulated as impurities by a variety of standards such as JIS, the impurity standards are applied in the present alloys as well. For example, in free-machining copper alloy rod C3601 which is described in the copper and copper alloy rods section in JIS H 3250, Fe is treated as an inevitable impurity when the content thereof is 0.3 mass % or less. In C36000 of ASTM B16 and C37700 of ASTM B124 as well, Fe is treated as an inevitable impurity when the content thereof is 0.3 mass % or less. Therefore, in the hot-forged copper alloy part of the invention as well, Fe is treated as an inevitable impurity when the content thereof is 0.3 mass % or less.

Regarding the hot forgeability, corrosion resistance, machinability and strength of the invention alloy, not only the composition ranges of the respective elements but also the relationships with Cu, Zn, Pb, Si and selectively included elements become important. That is, the composition coefficient (composition coefficients 1, 2 and 4) becomes important.

When the composition coefficients are summarized, the following relational formula can be expressed.

$$59 \leq ([Cu] + a1c1 + a2c2 + a3c3 + a4c4 + a5c5 + a6c6 + a7c7 + a8c8 + a9c9 + a10c10 + a11c11 + a12c12 + a13c13) \leq 64$$

a1 is the coefficient of Pb which is 0.5, c1 is the content of Pb which is represented using mass %, a2 is the coefficient of Si which is −4.5, c2 is the content of Si which is represented using mass %, a3 is the coefficient of Ni which is 2.2, c3 is the content of Ni which is represented using mass %, a4 is the coefficient of Mn which is 1.4, c4 is the content of Mn which is represented using mass %, a5 is the coefficient of As which is 0.5, c5 is the content of As which is represented using mass %, a6 is the coefficient of Zr which is 0.5, c6 is the content of Zr which is represented using mass %, a7 is the coefficient of B which is 0.5, c7 is the content of B which is represented using mass %, a8 is the coefficient of Bi which is 0.5, c8 is the content of Bi which is represented using mass %, a9 is the coefficient of Sb which is −1.2, c9 is the content of Sb which is represented using mass %, a10 is the coefficient of Sn which is −1.2, c10 is the content of Sn which is represented using mass %, a11 is the coefficient of Mg which is −1.2, c11 is the content of Mg which is represented using mass %, a12 is the coefficient of Al which is −2.2, c12 is the content of Al which is represented using mass %, a13 is the coefficient of P which is −1.2, and c13 is the content of P which is represented using mass %.

The composition coefficient is applied in the ranges of the contents: 0.003 mass % to 0.3 mass % of Pb which is contained in the first to fourth invention alloys, 0.05 mass % to 4.5 mass % of Si which is contained in the second to fourth invention alloys, furthermore, 0.01 mass % to 0.3 mass % of As, 0.01 mass % to 0.3 mass % of Sb, 0.01 mass % to 0.3 mass % of P, 0.01 mass % to 0.3 mass % of Mg, 0.01 mass % to 1.5 mass % of Sn, 0.01 mass % to 1.0 mass % of Al, 0.01 mass % to 4.0 mass % of Mn, 0.01 mass % to 4.0 mass % of Ni, 0.0005 mass % to 0.05 mass % of Zr, 0.0005 mass % to 0.05 mass % of B and 0.003 mass % to 0.3 mass % of Bi which are selectively contained in the fourth invention alloy. In a case in which each of the elements is below the lower limit value of each of the concentration ranges, the composition coefficient is rarely influenced, and therefore the elements are considered to be the same as inevitable impurities, and the contents of the elements are set to 0 mass % in the above-described relational formula.

Another method for expressing the composition coefficient can be represented by the fourth composition coefficient, and is represented by $$59 \leq ([Cu] + 0.5 \times [Pb] - 4.5 \times [Si] + 2.2 \times [Ni] + 1.4 \times [Mn] + 0.5 \times ([As] + [Zr] + [B] + [Bi]) - 1.2 \times ([Sb] + [Sn] + [Mg]) - 2.2 \times [Al] - 3 \times [P]) \leq 64.$$

In a case in which the contents of the respective elements are smaller than the lower limit, for example, the content of Pb is smaller than 0.003 mass %, the content of Si is smaller than 0.05 mass %, the content of Ni is smaller than 0.01 mass %, the content of Mn is smaller than 0.01 mass %, the content of As is smaller than 0.01 mass %, the content of Zr is smaller than 0.0005 mass %, the content of B is smaller than 0.0005 mass %, the content of Bi is smaller than 0.003 mass %, the content of Sb is smaller than 0.01 mass %, the content of Sn is smaller than 0.01 mass %, the content of Mg is smaller than 0.01 mass %, the content of Al is smaller than 0.01 mass %, and the content of P is smaller than 0.01 mass %, the contents of the elements are set to 0 mass %.

The composition coefficient mathematizes influences on the deformation resistance, moldability, deformability, and metal structure of the respective effective elements in addition to Cu during forging and the metal structure, strength, ductility and corrosion resistance of the respective effective elements after forging. The coefficients of the respective elements were experimentally obtained. Particularly, the composition coefficient has a strong relationship with the metal structures during forging and after forging. Therefore, when the respective elements satisfy the respective predetermined composition ranges and the ranges of the composition coefficients, the tubular hot-forged part of the application can be obtained.

The lower limit of the composition coefficient is 59 which is a lower limit value necessary to ensure the moldability, strength, ductility and corrosion resistance of forged parts. This is because, when the composition coefficient is below 59, the area ratio of the α phase during forging becomes 0% or less than 3%, and the area ratio of the β phase after forging becomes high or the proportion of the α phase decreases. In order to improve the metal structure and to further improve the above-described characteristics, the lower limit is preferably 60 or more, and optimally 61 or more.

On the other hand, when the composition coefficient exceeds 64, since the area ratio of the α phase during forging increases such that the hot deformation resistance increases, the hot deformation resistance increases even when the forging material is a tubular forging material, and the fluidity of the material during forging is poor such that it is not possible to mold the material into predetermined dimensions, the deformability becomes poor, and there are cases in which cracking occurs. In a low power hot forging facility, it is difficult to mold the material into the near net shape. The composition coefficient is preferably 63.5 or less. Particularly, in a case in which a forging material produced using a continuous cast tube is used, when crystal grains in the forging material are not miniaturized to 300 μm or less, the deformation resistance becomes high, a high power becomes necessary, and the moldability and deformability deteriorate, and therefore the composition coefficient is preferably 63.5 or less. In order to obtain high strength as well, the composition coefficient is 64 or less, and preferably 63.5 or less. When the composition coefficient exceeds 64, a problem is caused during cutting.

As described above, the invention alloy contains inevitable impurities such as Fe; however, when the total content of the inevitable impurities is less than 1 mass %, there is no significant influence on the composition coefficient, and therefore it is not necessary to input the inevitable impurities in a formula that computes the composition coefficient.

Next, the hot forging temperature, that is, the temperature of the forging material immediately before forging is in a range of 650° C. to 800° C. When the hot forging temperature is lower than 650° C., the hot deformation resistance becomes low, and it is difficult to manufacture hot-forged parts using a low power hot forging facility. The hot forging temperature is preferably 670° C. or higher. On the other hand, when the hot forging temperature exceeds 800° C., the proportion of the α phase decreases such that crystal grains coarsen, there is a higher probability of the occurrence of hot forging cracking, and the service life of a mold shortens. The hot forging temperature is preferably 780° C. or lower. The cooling rate after forging has an influence mainly on corrosion resistance, and hot-forged parts are preferably cooled at an average cooling rate in a range of 0.1° C./second to 60° C./second in a temperature range of the temperature of the material when the forging ends to 300° C. or in a temperature range of 650° to 300°.

The metal structure during hot forging serves as a vital point in achieving the object of the invention. That is, in Cu—Zn—Pb alloys and Cu—Zn—Pb—Si alloys obtained by adding, for example, Si to Cu—Zn—Pb alloys, phases appearing in the composition range of the invention alloy and in a temperature range of 650° C. to 800° C. are mainly two phases of the α phase and the β phase. Since the α phase has a high hot deformation resistance, and the β phase has a low hot deformation resistance, it is necessary to increase the proportion of the β phase during hot forging. Meanwhile, the β phase during hot forging transforms mainly into the α phase through phase transformation; however, when the proportion of the β phase during hot forging excessively increases, a large amount of the β phase remains in forged parts. When a large amount of the β phase is present in forged parts, the corrosion resistance and the ductility deteriorate, and therefore the amount of the β phase needs to be small, and it is preferable to set the upper limit of the β phase or the lower limit of the α phase which are present during forging. When the concentration of Si exceeds 1.5 mass %, the κ, γ and μ phases appear, and, furthermore, when the content of Si increases, there are cases in which ζ phase, X phase and the like appear. When a Cu—Zn—Pb alloy contains 0.4 mass % or more of Sn or 0.7 mass % or more of Al, there are cases in which the γ phase appears.

The hot deformation resistance or fluidity of the material during forging is mainly determined by the proportions of the above-described phases or the composition coefficient in addition to the temperature. When the hot deformation resistance of the α phase is set to 100, the composition of the copper alloy of the invention has little influence, the hot deformation resistance of the β phase is approximately 20, the hot deformation resistances of the γ, κ, ζ and X phases are approximately 30, and the hot deformation resistance is determined mainly by the proportion of the α phase. However, the hot deformation resistance is not simply determined by the proportion of the α phase, and, when the hot deformation resistance of an α single phase alloy is set to 100, and the area ratio of the α phase is in a range of 0% to 70%, it is possible to express the hot deformation resistance of Cu—Zn—Pb alloys having a proportion of the α phase of Y % to be approximately 2000/(100-Y). That is, when the proportion of the α phase is 0%, the hot deformation resistance is 20; similarly, when the area ratio of the α phase is 10%, the hot deformation resistance is 22; when the area ratio of the α phase is 25%, the hot deformation resistance is 27; when the area ratio of the α phase is 40%, the hot deformation resistance is 33; and when the area ratio of the α phase is 50%, the hot deformation resistance is 40, which is simply approximately double the hot deformation resistance obtained when the area ratio of the α phase having the lowest deformation resistance is 0%. However, when an α phase ratio is 60%, the value of 2000/(100-Y) is 50; when the α phase ratio is 65%, the value is, similarly, 57; and the hot deformation resistance abruptly increases from an α phase ratio of 60%, and reaches an impermissible level in terms of the power of a forging machine. Therefore, when the area ratio of the α phase in the metal structure of the forging material immediately before hot forging is in a range of 3% to 60%, and, furthermore, when the hot forging material is heated at a standard hot forging temperature of 720° C., the area ratio of the α phase is preferably in a range of 3% to 60%.

When the area ratio of the α phase is smaller than 3%, that is, when the proportion of the β, γ, κ, ζ and X phases becomes 97% or more, crystal grains coarsen during hot forging such that there is a higher probability of the occurrence of forging cracking. In the metal structure after forging, the area ratio of the α phase decreases, and the ductility and the corrosion resistance deteriorate. When the area ratio of the α phase exceeds 60%, the hot deformation resistance increases as described above, it becomes impossible to mold the forging material into the near net shape, a high power hot forging facility becomes necessary, and it becomes difficult to mold a forging material having a degree of uneven thickness in a range of, for example, 10% to 30% which is the subject of the invention. The proportion of the α phase during hot forging or when the forging material is heated at 720° C. needs to be 3% or more, and preferably 10% or more. When the corrosion resistance and ductility of the forged part after forging are taken into account, the corrosion resistance and the ductility improve as the area ratio of the α phase during hot forging increases, and therefore, the area ratio is preferably 25% or more, and more preferably 35% or more. Meanwhile, in terms of the power of a forging machine and the moldability, the area ratio of the α phase during hot forging or when the forging material is heated at 720° C. is 60% or less, preferably 55% or less, and more preferably 50% or less. When a tubular forged part is heated again at 720° C. and quenched, and then the metal structure is observed, it is possible to reproduce the phase structure when the forged part is hot-forged at 720° C. In the case of a continuous cast tube in which the size of crystal grains exceeds 300 μm, since the moldability deteriorates, and the deformation resistance also slightly increases, the area ratio of the α phase during hot forging or when the forging material is heated at 720° C. is preferably 50% or less.

Phases that are present in the metal structure after forging differ depending on contained elements and the contents of the elements; however, in alloys in the composition range of the invention forged part, there are cases in which the β phase and the γ phase are present in an α phase matrix, and, in the case of Cu—Zn—Pb—Si alloys containing 1.5 mass % or more, particularly, 2.5 mass % or more of Si, there are cases in which phases such as the β, γ, κ and μ phases are present. When the total area ratio of two phases of the β phase and the γ phase or the total area ratio of three phases of the β phase, the γ phase and the μ phase exceeds 25%, there is a problem with corrosion resistance and ductility. The total area ratio is preferably 15% or less, and more preferably 10% or less. Meanwhile, in order to improve the ductility of the hot-forged part, in a case in which 2.5 mass % or more of Si is contained, the area ratio of the α phase is 30% or more, and, in a case in which alloys containing 2.5 mass % or more of Si are excluded, the area ratio of the α phase is 75% or more, and preferably 90% or more. Furthermore, in the case of Cu—Zn—Pb—Si alloys containing 2.5 mass % or more of Si, since the κ phase has the same ductility and corrosion resistance as the α phase, the total area ratio of the α phase and the κ phase is preferably 85% or more, and optimally 90% or more, and then excellent corrosion resistance and favorable ductility are exhibited. As described above, the moldability and forgeability during forging and the corrosion resistance and ductility of the forged part contradict each other in terms of the metal structure, and the composition coefficient works in synchronization with the metal structure, and is thus important.

For Cu—Zn—Si—Zn alloys containing 3 mass % of Si, the respective phases of the α, κ, γ, β and μ phases being formed in Cu—Zn—Pb—Si alloys containing 1.5 mass % to 5 mass % of Si can be defined as described below from quantitative analysis results obtained using an X-ray microanalyzer in the case of the third invention alloy which contains 2.5 mass % to 3.9 mass % of Si in the Cu—Zn—Pb—Si alloy of the invention and the fourth invention alloy which is based on the third invention alloy.

The α phase in the matrix is made up of Cu: 73 mass % to 81 mass %, Si: 1.5 mass % to 3.2 mass %, and a remainder of Zn and other additional elements.

(Typical composition: 76Cu-2.4Si—Zn(remainder))

The κ phase which is an essential phase is made up of Cu: 73 mass % to 80 mass %, Si: 3.3 mass % to 4.7 mass %, and a remainder of Zn and other additional elements.

(Typical composition: 76Cu-3.9Si—Zn(remainder))

The γ phase is made up of Cu: 66 mass % to 75 mass %, Si: 4.8 mass % to 7.2 mass %, and a remainder of Zn and other additional elements.

(Typical composition: 72Cu-6.0Si—Zn(remainder))

The β phase is made up of Cu: 63 mass % to 74 mass %, Si: 1.8 mass % to 4.7 mass %, and a remainder of Zn and other additional elements.

(Typical composition: 69Cu-2.4Si—Zn(remainder))

The μ phase is made up of Cu: 76 mass % to 89 mass %, Si: 7.3 mass % to 11 mass %, and a remainder of Zn and other additional elements.

(Typical composition: 83Cu-9.0Si—Zn(remainder))

Here, the typical compositions refer to compositions of Cu—Zn—Pb—Si alloys containing 3 mass % of Si.

Based on what has been described above, the μ phase can be differentiated from the α, κ, γ and β phases using the concentration of Si, and the γ phase can be differentiated from the α, κ, β and μ phases using the concentration of Si. The μ phase and the γ phase have similar contents of Si, but have different concentrations of Cu which are below and above 76 mass %. The β phase can be differentiated from the γ phase using the concentration of Si, and the α, κ and μ phases can be differentiated from each other using the concentration of Cu. The α phase and the κ phase have similar concentrations of Si which are below and above 3.25 mass % or a range of 3.2 mass % to 3.3 mass %. The investigation of the crystal structures using EBSD shows that the α phase has an fcc structure, the β phase has a bcc structure, the γ phase has a bcc structure, and the κ phase has a hcp structure, which can be differentiated. The crystal structure of the κ phase is hcp; however, when 30% or more of the α phase is present, the forged part has favorable ductility.

The shape of the hot forging material will be described.

The forging material has a tubular shape, and is produced through hot extrusion, continuous casting or hot rolling. In a case in which the forging material is produced through hot extrusion, since the forging material is produced by, first, producing a cylindrical ingot, cutting the ingot into a predetermined length, and hot-extruding the ingot into a tubular shape, two processes of casting and extrusion are required. Meanwhile, a tubular rod being produced through continuous casting is produced through a single process of continuous casting, and thus one process is removed. Since the forging material produced through hot extrusion is subjected to a hot plastic process, crystal grains are small, and the moldability, deformability or corrosion resistance during hot forging is excellent. On the other hand, the forging material being produced through a continuous casting process generally has coarse crystal grains, for example, the size of the crystal grains in the microstructure is 500 μm or more, and therefore the moldability or deformability is poor. In the case of the invention, since a tubular material is used, large deformation is not required during hot forging, and thus a continuous cast rod tube can also be used. However, sometimes, there are cases in which large local deformation, fine molding and deformation are required, and thus crystal grains are preferably small. Hot forging breaks the metal structure of a cast metal so as to minimize crystal grains; however, when non-deformed portions and portions with a low degree of processing are partially present during hot forging, the metal structure of the cast metal remains or crystal grains are larger than portions with a high degree of processing, and therefore the strength is low, and the corrosion resistance deteriorates. In a case in which a continuous cast tube (hollow continuous cast rod) is used as the forging material, it is more preferable to minimize the crystal grains in the microstructure to 300 μm or less, and, furthermore, 200 μm or less in a casting step. When the size of the crystal grains is decreased, it is possible to improve deformability, moldability, a local decrease in strength, and the degradation of corrosion resistance during forging. As described above, when Zr, B and Mg, particularly, Zr and P are added to Cu—Zn—Pb alloys, the crystal grains in the continuous cast tube become as small as 300 μm or less or 200 μm or less, which is preferable.

During hot forging, basically, the forging material is, mainly, compressively deformed, but the forging material is stretched in the longitudinal direction, flared, and molded due to the application of a stress that is equivalent to backward extrusion to a part of a cross-section or the application of a stress that is equivalent to flaring to a hollow forging material. The target forged part of the application and a material therefor have a close relationship.

When (average inner diameter)/(average outer diameter) is represented by A, the target tubular hot-forged part satisfies $0.4 \leq A \leq 0.92$, that is, (average thickness)/(average outer diameter) is in a range of 0.04 to 0.3. That is, when the average inner diameter of the hot-forged part is represented by DI, the average outer diameter is represented by DO, and the average thickness is represented by T, $0.4 \leq DI/DO \leq 0.92$, and $0.04 \leq T/DO \leq 0.3$. Furthermore, the hot-forged part has an average thickness T in a range of 3 mm to 15 mm, when (tube axis direction length)/(average thickness) is represented by B, satisfies $1 \leq B \leq 10$, has a favorable accuracy with a dimensional tolerance of ±2% or less with respect to the target dimensions and the target shape, and is finished into the near net shape. Here, the length of the forged part is equivalent to the length of the original tubular forging material (length in a tube axis direction). In addition, the optimal near net shape refers to a shape that is close to a required shape excluding thread cutting necessary for the forged part after hot forging, molding that is not possible through forging, boring, and cutting for ensuring dimensional accuracy or surface states. Although hot-forged parts have a complicated shape in the outer circumferential portion or have protrusions and the like in the outer circumferential portion so that the hot-forged part does not have a simple shape, it is not so difficult to compute the average outer diameter (average outside diameter), the average inner diameter (average inside diameter) and the average thickness from drawings of a forging mold and the like. The average outer diameter is obtained as described below. The volume of a forged part including a void portion is obtained (the volume can be obtained by immersing the forged part in water in a state in which the void portion is filled), the obtained volume is divided by the length (height) of the forged part in the longitudinal direction so as to compute the average cross-sectional area, and the radius of a perfect circle having the same area as the average cross-sectional area is used as the average outer diameter of the forged part. The average inner diameter can be also obtained in the same manner using the volume of the void portion. Needless to say, it is possible to obtain the average outer diameter and the average inner diameter from drawings and the like. Since DO=DI+2T, a relationship of $0.04 \leq T/DO \leq 0.3$ is derived. As the value of the (average inner diameter)/(average outer diameter) of the hot-forged part increases, the proportion of a hole portion increases, and, when the value of the (average inner diameter)/(average outer diameter) is 0.4 or more, the effect of use of the tubular forging material becomes large. Naturally, when the forged part has a value of the (average inner diameter)/(average outer diameter) of preferably 0.5 or more, and more preferably 0.6, the effect becomes more favorable. As the value of the (average inner diameter)/(average outer diameter) of the hot-forged part increases, the effects becomes more favorable; however, since there is a problem with moldability, the upper limit is 0.92. Furthermore, the average thickness of the forged part which is the target subject of the application is 3 mm or more, preferably 3.5 mm or more, and still more preferably 4.0 mm or more, and is 15 mm or less, preferably 13 mm or less, and more preferably 11 mm or less while the average thickness is dependent on the relationship with length. When the shape of the lid, joint or the like of a water meter which is the target forged part is taken into account, the (tube axis direction length)/(average thickness): B needs to be 1 or more, is preferably 2 or more, and more preferably 2.5 or more. The upper limit is 10 or less, preferably 8 or less, and more preferably 6 or less.

In order to mold the tubular hot-forged part with a favorable yield rate, in the tubular forging material, the (average inner diameter)/(average outer diameter): A needs to be in a range of 0.3 to 0.88, and the (tube axis direction length)/(average thickness): B needs to be in a range of 0.8 to 12. In order to set the (average inner diameter)/(average outer diameter): A of the target hot-forged part to 0.4 or more, in the void forging material, A needs to be set to 0.3 or more. When A exceeds 0.88, there is a problem with moldability. Meanwhile, when B becomes smaller than 0.8, during the cutting of the material, for example, in a case in which an ordinary saw is used to cut the material, a number of chips are generated, the loss becomes large, and, while depending on forged shapes, a high power becomes necessary. When a cutting method which does not generate chips, such as shear cutting, is employed, there is no problem with loss. B is preferably 1 or more, more preferably 1.2 or more, and optimally 1.5 or more. On the other hand, when B exceeds 12, the loss during cutting decreases, but a hot forging copper alloy begins to bend, and there is a problem with moldability. B is preferably 10 or less, and more preferably 8 or less. The values of A and B are approximately determined depending on the shape of the hot-forged part. Generally, in the case of free forging, when the B value exceeds 3, the hot forging copper alloy bends, and therefore it is considered that the B value is preferably set to 2.5 or less; however, when the tubular material of the invention is used, the B value is allowed to be up to approximately 12. For materials having a thickness of less than 3 mm, whether the materials are produced into a continuous cast tube or a hot-extruded tube, production takes a large cost, there is a higher probability of deformation or bending during hot forging, and it becomes impossible to mold the material into a predetermined shape. On the other hand, when the thickness exceeds 25 mm, the power becomes too large during hot forging, and, while depending on the shape of the final forged part as well, the loss during the cutting of the material becomes too large. The outer shape of the forging material is generally round, but may be, for example, hexagonal, and depends on the target forging shape.

Furthermore, regardless of whether the forging material is a continuous cast tube or a hot-extruded tube, the cross-section is not a uniform concentric circle, and the thickness is somewhat uneven. In spite of the uneven thickness, the target tubular hot-forged part needs to be molded into a predetermined shape with a favorable dimensional accuracy, and the yield rate needs to be favorable. The degree of unevenness C is defined as ((1−(minimum thickness/maximum thickness))×100) % on a cross-section perpendicular to the tube axis direction of the forging material, and it was experimentally obtained that, when a material with the above-described composition has a content of C of 30% or less in an arbitrary place in the tube axis direction, it is possible to mold the material into a predetermined near net shape with a favorable yield rate and a dimensional tolerance in a range of ±2%.

Generally, alloys of copper and zinc thermally expand when heated, and, for example, when heated from 20° C. to 700° C., the alloys expand by approximately 1.5%. The dimensional accuracy of the hot-forged part, including the thermal expansion of molds and the error of the hot forging temperature or the mold temperature, is allowed to be ±2% when a predetermined dimension is 50 mm, and is considered to be preferable when the tolerance is ±1% or less. Here, the predetermined shape is based on the dimensions of the respective portions when the degree of uneven thickness C is 0% or is based on dimensions computed in consideration of the compression and the like of the material during the design of the mold. When the hot-forged part had a dimension with a tolerance of ±2% of the predetermined shape or a dimension within ±0.2 mm of the predetermined shape that was 10 mm or less, the dimensional accuracy was considered to be "favorable", and, when the hot-forged part had a dimension with a tolerance of ±1% or a dimension within ±0.1 mm of the predetermined shape that was 10 mm or less, the dimensional accuracy was considered to be "excellent". In order to obtain excellent moldability, the degree of uneven thickness C is preferably set to 15% or less. Furthermore, for forged-parts having B of more than 6.25, in order to mold the material into a predetermined shape, it is necessary to satisfy $C \leq 75 \times 1/B^{1/2}$, and preferably $C \leq 50 \times 1/B^{1/2}$. That is, when the B value increases, and the degree of uneven thickness C increases, the material does not sufficiently rotate during molding such that there is a problem with moldability.

EXAMPLES

Hot-forged copper alloy parts were produced using the above-described first to fourth invention alloys and a copper alloy having a composition for comparison. Table 1 describes the compositions of alloys used to produce the hot-forged copper alloy parts.

TABLE 1

| Alloy No. | | Alloy composition (mass %) | | | | | | | | | | | | | | Composition coefficient |
|---|---|---|---|---|---|---|---|---|---|---|---|---|---|---|---|---|
| | | Cu | Zn | Pb | Si | P | Zr | As | Sb | Mg | Sn | Al | B | Bi | Ni | Mn | |
| 1 | First invention alloy | 61.5 | rem | 0.06 | | | | | | | | | | | | | 61.53 |
| 2 | Second invention alloy | 61.4 | rem | 0.04 | 0.18 | | | | | | | | | | | | 60.61 |

TABLE 1-continued

| Alloy No. | | Alloy composition (mass %) | | | | | | | | | | | | | | Composition coefficient |
|---|---|---|---|---|---|---|---|---|---|---|---|---|---|---|---|---|
| | | Cu | Zn | Pb | Si | P | Zr | As | Sb | Mg | Sn | Al | B | Bi | Ni | Mn | |
| 3 | Fourth invention alloy | 60.1 | rem | 0.008 | | | | 0.05 | | | 0.6 | | | 0.05 | 1 | | 61.43 |
| 4 | Third invention alloy | 75.6 | rem | 0.02 | 3.1 | | | | | | | | | | | | 61.66 |
| 5 | First invention alloy | 60.5 | rem | 0.04 | | | | | | | | | | | | | 60.52 |
| 6 | Fourth invention alloy | 62.6 | rem | 0.12 | | 0.04 | 0.007 | | | 0.08 | 0.5 | | | | | | 61.85 |
| 7 | Fourth invention alloy | 76.4 | rem | 0.004 | 3.2 | 0.08 | 0.004 | | 0.03 | | | | | | | | 61.73 |
| 21 | Fourth invention alloy | 61.6 | rem | 0.006 | | | | | | | 0.7 | | | | | | 60.76 |
| 22 | Fourth invention alloy | 61 | rem | 0.14 | | | | 0.04 | | | | | | | 0.35 | | 61.79 |
| 23 | Fourth invention alloy | 62.4 | rem | 0.09 | | 0.04 | | | 0.03 | | 0.6 | | | | 0.12 | | 61.71 |
| 24 | Fourth invention alloy | 61.5 | rem | 0.06 | 0.23 | | | | | | | | 0.03 | | | | 60.51 |
| 25 | Fourth invention alloy | 64 | rem | 0.08 | | 0.07 | 0.01 | | | | 0.8 | 0.23 | | | | | 62.37 |
| 26 | Fourth invention alloy | 76.9 | rem | 0.02 | 4 | 0.05 | 0.02 | | | 0.07 | 0.6 | | | | 1.2 | 0.6 | 60.49 |
| 27 | Fourth invention alloy | 76.3 | rem | 0.01 | 2.8 | 0.08 | 0.006 | | 0.05 | | 0.4 | | | 0.01 | | | 62.53 |
| 28 | Fourth invention alloy | 75.8 | rem | 0.007 | 3.1 | | | 0.04 | 0.03 | | | | | | | | 61.94 |
| 29 | Fourth invention alloy | 77 | rem | 0.02 | 2.8 | 0.08 | 0.005 | 0.05 | | | 0.5 | | | | | | 63.60 |
| 30 | Fourth invention alloy | 82.3 | rem | 0.04 | 4.3 | 0.08 | | | 0.04 | | | | | | | | 62.68 |
| 31 | Fourth invention alloy | 81 | rem | 0.07 | 4 | | | 0.05 | 0.05 | | | | | 0.008 | | | 63.00 |
| 32 | Fourth invention alloy | 80.4 | rem | 0.02 | 3.9 | 0.08 | 0.008 | | | 0.03 | 0.5 | 0.03 | | | | | 61.92 |
| 33 | Fourth invention alloy | 64.8 | rem | 0.09 | 0.32 | | | | | | | | | | | | 63.41 |
| 101 | Comparative alloy | 64.7 | rem | 0.07 | | | | | | | | | | | | | 64.74 |
| 102 | Comparative alloy | 58.5 | rem | 0.06 | | | | 0.05 | | | | | | | | | 58.56 |
| 103 | Comparative alloy | 60.1 | rem | 0.09 | 0.58 | | | | 0.03 | | | | | | | | 57.50 |
| 104 | Comparative alloy | 65.4 | rem | 0.05 | | | | 0.03 | 0.05 | | 0.2 | 0.3 | | | 0.2 | | 64.88 |
| 105 | Comparative alloy | 76.9 | rem | 0.05 | 2.7 | 0.06 | 0.02 | 0.03 | | | | | | | | | 64.62 |
| 106 | Comparative alloy | 75.1 | rem | 0.03 | 3.9 | 0.03 | | | | | | 0.1 | | | | | 57.26 |

TABLE 1-continued

| Alloy No. | | Alloy composition (mass %) | | | | | | | | | | | | | | Composition coefficient |
|---|---|---|---|---|---|---|---|---|---|---|---|---|---|---|---|---|
| | | Cu | Zn | Pb | Si | P | Zr | As | Sb | Mg | Sn | Al | B | Bi | Ni | Mn | |
| 107 | Comparative alloy | 61.3 | rem | 0.001 | | | | | | | | | | | | | 61.30 |
| 108 | Comparative alloy | 62.5 | rem | 0.002 | 0.14 | 0.05 | 0.02 | | 0.02 | | | | | | | | 61.71 |
| 109 | Comparative alloy | 58.3 | rem | 1.82 | | | | | | | 0.2 | | | | | | 58.97 |
| 110 | Comparative alloy | 62.9 | rem | 1.75 | | 0.03 | | 0.04 | | | 0.3 | | | | | | 63.35 |
| 111 | Comparative alloy | 61.4 | rem | 0.38 | 0.16 | | | | | | | | | | | | 60.87 |
| 112 | Comparative alloy | 75.7 | rem | 0.36 | 3.1 | | | 0.03 | 0.05 | | | | | | | | 61.89 |
| 113 | Comparative alloy | 64.8 | rem | 0.07 | 0.26 | | | | | | | | | | | | 63.67 |
| 114 | Comparative alloy | 78 | rem | 0.06 | 3.1 | | | | | | | | | | | | 64.08 |

Ingots which had the compositions of the respective alloys in Table 1 and had a diameter of 240 mm were prepared. The surfaces of the ingots were polished so as to have a diameter of 200 mm, heated at 720° C., and hot-extruded, thereby producing extruded tubes having an outer diameter of 72.5 mm and a thickness of 8.25 mm and extruded tubes having an outer diameter of 76.5 mm and a thickness of 15 mm. Similarly, the ingots were continuous-cast, thereby producing continuous cast tubes having an outer diameter of 72.5 mm and a thickness of 8.25 mm and continuous cast tubes having an outer diameter of 76.5 mm and a thickness of 15 mm. In order to investigate the influences of uneven thickness and the like, the extruded tubes and the continuous cast tubes which had an outer diameter of 76.5 mm and a thickness of 15 mm were molded through cutting into a predetermined shape having an outer diameter of 72.5 mm and a thickness of 8.25 mm. In order to investigate the influence of molds, continuous cast tubes having an outer diameter of 72.5 mm and a thickness of 23.0 mm were prepared.

Therefore, forging materials have (average inner diameter)/(average outer diameter): A of approximately 0.77 and (tube axis direction length)/(average thickness): B of approximately 2.7 (the details will be described below).

As a comparison material, some of the alloys were used, ingots having a diameter of 240 mm were heated at 720° C., and hot-extruded, thereby preparing solid rods (not tubes) having an outer diameter of 40 mm.

As a comparative example, cylindrical ingots having a diameter of 240 mm were hot-extruded into an outer diameter of 40 mm. The materials do not have a tubular or circular shape but a rod shape.

FIG. 1 illustrates a target shape of a forged part in hot forging. The forged part has a tubular shape, the bottom outer diameter is represented by a, the top outer diameter is represented by c, the bottom inner diameter is represented by j, the top inner diameter is represented by k, the tube axis direction length is represented by i, a partial length 1 that is the tube axis direction length of a portion with the inner diameter k is represented by i1, and a partial length 2 that is the tube axis direction length of a portion with the inner diameter j is represented by i2.

FIG. 1 shows that the average outer diameter is a and c that are 77 mm, the average inner diameter is approximately 64.8 mm, the average thickness is approximately 6.1 mm, the tube axis direction length is i that is 25 mm, the (average inner diameter)/(average outer diameter): A of the forged part is approximately 0.84, and the (tube axis direction length)/(average thickness): B is approximately 4.1.

When portions which have been finished with a mechanical process that is required are included, the weight is approximately 289 g (the density is slightly different from that of the prepared alloy, that is, 283 g to 291 g, and thus the density is approximately 8.3 g/cm$^3$ to 8.55 g/cm$^3$), and the forged parts are ideal forged parts with no unnecessary portions. When forged parts having a weight that is within +10% of the target weight of 289 g are obtained through a single hot forging process, it can be said that materials could be hot-forged into an almost ideal near net shape. Forging is carried out by compression and backward extrusion, and a mold was used so that a surface having a product inner diameter of 56 mm became the bottom surface and a surface having a product inner diameter of 70 mm became the top surface.

Figure 2:
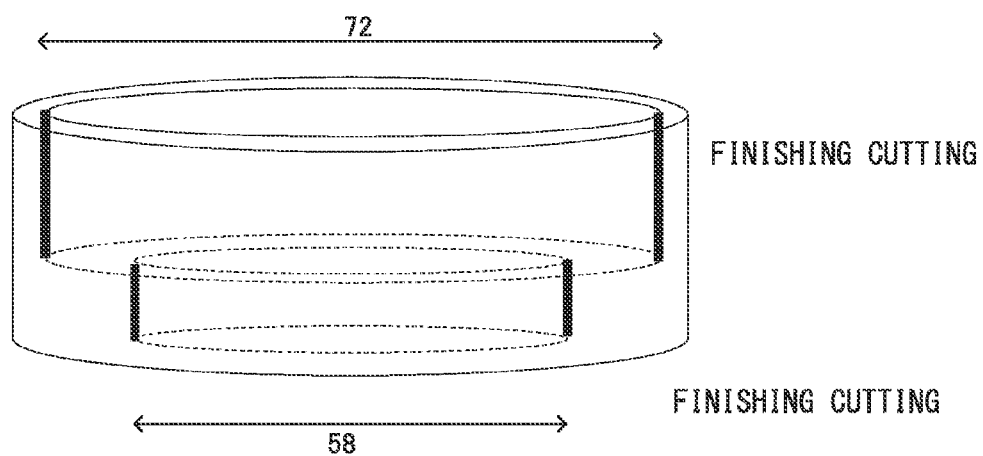
FIG. 2 is a view illustrating a shape of a forged part after cutting.

In order to check whether or not a cutting process suitable for actual products is possible, finishing cutting to an inner diameter of 72 mm was carried out on the side of the forged part with an inner diameter of 70 mm, and finishing cutting to an inner diameter of 58 mm was carried out on the side of the forged part with an inner diameter of 56 mm as illustrated in FIG. 2.

For the forged parts, the evaluation of the metal structure and the hardness, the dezincification corrosion test of "ISO 6509", and the drill cutting test were carried out as described below.

<Metal Structure>

The metal structures of the following three specimens were observed.

(1) A specimen that had been hot-forged and then air-cooled (2) A specimen obtained by heating a forming material at a predetermined temperature to prepare the material to be hot-forged, holding the material for one minute, and then quenching the material using water without forging (3) A specimen obtained by heating a hot-forged part at approximately 720° C., holding the part for one minute, and then quenching the part For all the specimens, the metal structures were observed on cross-sections that were cut 5 mm or more inside from the end surface in the tube axis direction and ¼ thickness deep from the outer circumferential surface and were perpendicular to the tube axis direction. Thick portions having a small deformation amount of the hot-forged parts were observed. The metal structure was observed by mirror-grinding the cut surface of the specimen, etching the surface using a liquid mixture of hydrogen peroxide and ammonia water, and measuring the area ratios (%) of the $\alpha$ phase, the $\beta$ phase, the $\kappa$ phase, the $\gamma$ phase and the $\mu$ phase through image analysis. The area ratios of the respective phases were obtained by binarizing the 200 times or 500 times-magnified optical microscopic structures using image processing software "WinROOF" (trademark). The area ratios were measured at three view points, and the average value was used as $\alpha$ phase ratio of each of the phases.

In a case in which it was difficult to identify phases, the phases were specified using an electron back scattering diffraction pattern (FE-SEM-EBSP) method, and the area ratios of the respective phases were obtained. A JSM-7000F (trademark) manufactured by JEOL Ltd. was used in FE-SEM, OIM-Ver. 5.1 (trademark) manufactured by TSL Solutions was used in the analysis, and the area ratios were obtained using phase maps with analysis magnifications of 500 times and 2000 times.

Data of the specimen (1) will be described in a column of "the area ratios of the respective phases in the forged part" in Table 3 and the like which will be described below, data of the specimen (2) will be described in the column of "the area ratio of the $\alpha$ phase immediately before forging", and data of the specimen (3) will be described in the column of "720° C. $\alpha$ phase".

<Hardness>

The Vickers hardness (at a load of 9.8 N) of the cross-sections of the hot-forged parts and the forging materials was measured.

<Dezincification Corrosion Test of "ISO 6509">

In the dezincification corrosion test of "ISO 6509", specimens sampled from the respective hot-forged parts were implanted in a phenol resin material so that the exposed surface of the specimen became perpendicular to the flowing direction of the hot forging or perpendicular to the longitudinal direction of the original material, the surfaces of the specimens were ground using Emery paper up to No. 1200, then, the surfaces were ultrasonically washed in pure water, and the surfaces were dried.

The corroded test specimens obtained in the above manner were immersed in an aqueous solution (12.7 g/L) of 1.0% copper (II) chloride ($CuCl_2.2H_2O$), held at a temperature condition of 75° C. for 24 hours, then, removed from the aqueous solution, and the maximum value of the dezincification corrosion depth (maximum dezincification corrosion depth) was measured. In order to investigate the corrosion resistance, the dezincification corrosion test was carried out according to the test method specified in ISO 6509.

The specimens were again implanted in the phenol resin material so that the exposed surface was held perpendicular to the flowing direction of the hot forging or the longitudinal direction of the original material, and then the specimens were cut so as to obtain longest cut portions. Subsequently, the specimens were ground, and the corrosion depths were observed at 10 view points using a metal microscope having a magnification of 100 times to 500 times. The deepest corrosion point was used as the maximum dezincification corrosion depth. In a case in which the test was carried out according to the above-described method, since the maximum corrosion depth of 400 µm or less was considered to be favorable, the maximum corrosion depth of 100 µm or less was considered to be excellent in terms of corrosion resistance, the maximum corrosion depth of 600 µm or less was considered to be "practically available", and the maximum corrosion depth of more than 600 µm was considered to be "practically problematic in terms of corrosion resistance".

<Drill Cutting Test>

A peripheral portion having an inner diameter of 56 mm (place that corresponds to h in the product dimension measurement locations) that is equivalent to the bottom portion of the forged part was dry-cut through 8.0 mm-deep drilling in a drilling machine using an HSS JIS standard drill with $\phi$ of 3.0 mm at a rotation rate of 1250 rpm and a feed of 0.17 mm/rev. During the drilling process, voltage changes were sampled in a circumferential direction and an axis direction using an AST-type tool dynamometer, and the torque thrust during the drilling process was computed. The voltage changes were measured four times for each sample, the average value was employed, the voltage change of a commercially available free-cutting brass rod C3604 made of 60 mass % Cu-3 mass % Pb-0.2 mass % Fe-0.2 mass % Sn—Zn (remainder) was considered to be 100, and the voltage changes were relatively evaluated. As the cutting coefficient increases, the machinability becomes more favorable.

That is, the cutting coefficient was obtained as described below.

The index (cutting index) of the drill test result of the specimen=(torque index+thrust index)/2

The torque index (%) of the specimen=(the torque of C3604/the torque of the specimen)×100

The thrust index (%) of the specimen=(the thrust of C3604/the thrust of the specimen)×100

The moldability and the like were evaluated by changing the hot forging conditions as described below.

<The Influence of the Shape of the Forging Material>

The rods ($\phi$40) that had been obtained through hot extrusion as the comparative example of the invention for which the forging material had a tubular shape were placed vertically (the axis direction of the rod was set to the vertical direction) and horizontally (the axis direction of the rod was set to the horizontal direction), and forged with a full power of a hot forging press capacity of 150 tons. The temperature immediately before forging (hot forging temperature) was managed within a ±10° C. range of 720° C., and held for one minute. The forging material was directly heated using a gas burner, and forged while checking whether or not the forging material was heated within a predetermined temperature range using a radiation thermometer.

Figure 3A:
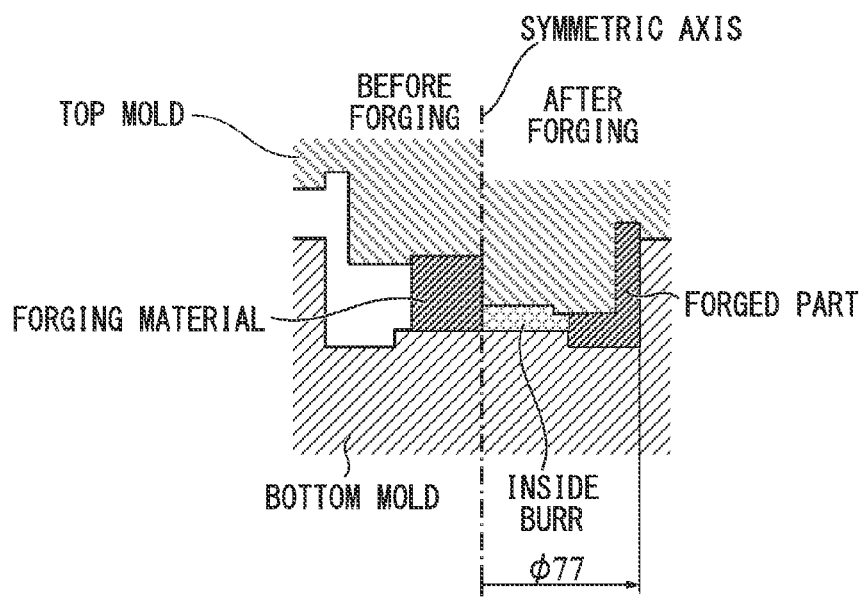
FIG. 3A is a schematic view of a mold used for a rod-shaped forging material.
Figure 3B:
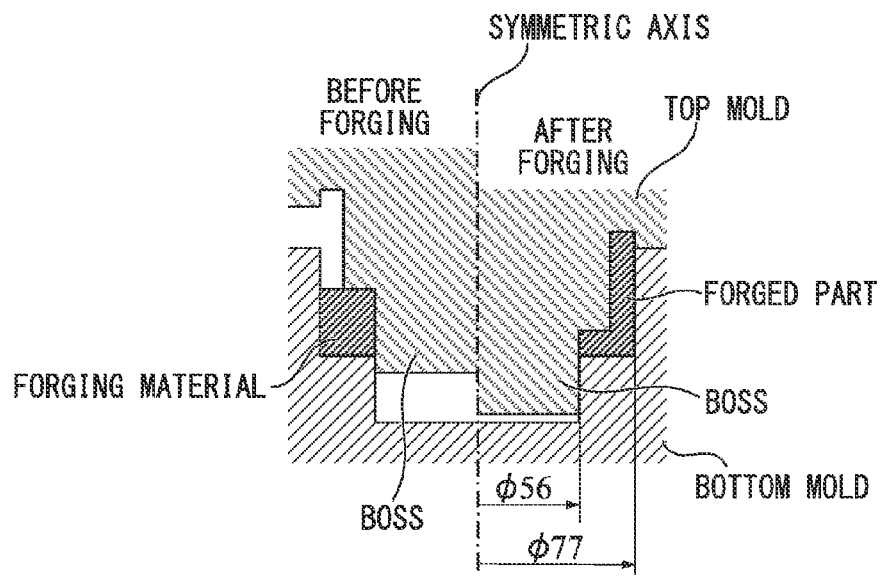
FIG. 3B is a schematic view of a mold used for a tubular forging material.

FIGS. 3A and 3B illustrate schematic views of a mold used for a rod-shaped forging material and a tubular forging material. FIG. 3A is a schematic view of a cross-section of a mold for rod-shaped forging materials when a rod-shaped forging material is forged, and illustrates the states before and after forging on the left and right sides of the symmetric axis in the center of the drawing. FIG. 3B is a schematic view of a cross-section of a mold for tubular forging materials when a tubular forging material is forged, and illustrates the states before and after forging on the left and right sides of the symmetric axis in the center of the drawing.

Since a boss is attached to the mold for tubular forging materials, it is possible to forge a forging material in a manner in which the occurrence of inside burrs is prevented or decreased in forged parts. Then, it is possible to forge a forging material into the near net shape, and the cutting load after forging can be reduced. However, in the case of forging of a rod material, since it is not possible to make the material hollow, it is not possible to prevent the occurrence of inside burrs, and a material weight obtained by adding the weight of inside burrs to the weight of the product becomes necessary. In order to reduce the weight of the inside burrs, it is necessary to further increase the forging load, and there is a probability of the occurrence of the limitation on facilities.

Figure 4A:
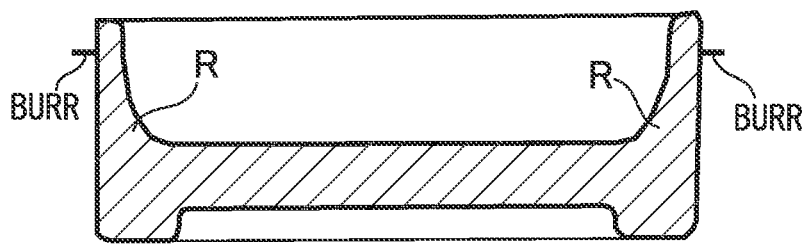
FIG. 4A is a schematic view of a cross-sectional shape of a forged part that has been forged using a rod-shaped forging material.
Figure 4B:
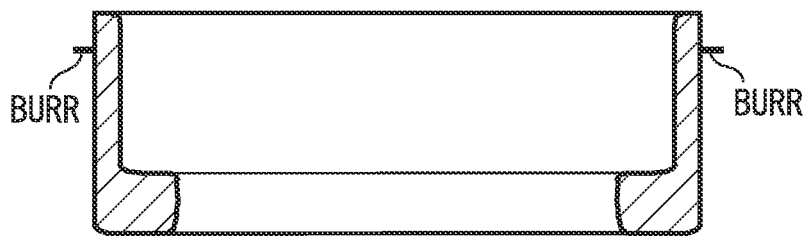
FIG. 4B is a schematic view of a cross-sectional shape of a forged part that has been forged using a tubular forging material.

FIG. 4A illustrates a cross-sectional shape of a forged part that has been forged using a rod-shaped forging material, and FIG. 4B illustrates a cross-sectional shape of a forged part that has been forged using a tubular forging material.

In the case of forging of a rod-shaped material as described above, it was not possible to prevent the occurrence of inside burrs, and, additionally, there was a limitation with the press capacity of a hot forging machine of 150 tons such that it was necessary to supply a large cutting allowance from the target forging shape and, additionally, to supply a larger R than necessary to angular portions.

Table 2 describes the results when the rod-shaped forging material was used.

resistance was slightly high, there was some concern that the service life of the tool might be decreased during mass cutting, but mass cutting was possible, and there was no problem with product properties, the cutting was evaluated to be "Δ"; and when chips were thick and not segmented, the product surface was scratched, tools were entangled, wrinkled defects were generated on the product surface, a favorable surface state could not be obtained, or tools were worn during cutting, the cutting was evaluated to be "X".

The weights necessary to mold the material into predetermined dimensions were approximately 480 g in a case in which the rods were placed vertically and approximately 510 g in a case in which the rods were placed horizontally for all of Alloy Nos. 1, 4, 6 and 7. When the weight was below the above-described weight, underfill occurred on the end surface on the side with an inner diameter of $\phi$70. In Alloy No. 4, when the rod was placed horizontally, forging was carried out with a power increased to 500 tons, but the material could be molded at a weight of approximately 450 g, and it was possible to decrease the weight of the material by approximately 60 g by increasing the forging load up to 500 tons.

Specimens forged with approximately 510 g of the material horizontally placed were sampled from the respective alloys, and a cutting process was carried out so as to obtain the final product of FIG. 2. As is evident from the cross-sectional shapes of the forged parts molded from rods in FIGS. 4A and 4B, since spacious cutting allowances were supplied for inside burrs and the inner diameter portion, a finishing process was carried out after the inner burrs were cut using a pressing machine, and, furthermore, the inner diameter portion was removed through a rough cutting process. The finishing cutting process is equivalent to the cutting of forged parts obtained from the invention alloys described below in Tables 11 to 13. That is, in the hot-forged parts of the invention, the rough cutting process which is required in a case in which a rod material is used becomes unnecessary. In Alloys No. 4 and 7, the cutting indexes described below were favorable, no problem occurred during the rough process, and finishing cutting was favorable. In Alloy Nos. 1 and 6, the cutting index described below was "available", thick chips were continuously generated during the rough process, and the amount of the rough cutting processing was large, and

TABLE 2

| Alloy No. | Placement direction | Forging temperature ° C. | Moldability | Forging load ton | Weight g | Cutting of forged part Rough cutting | Finishing |
|---|---|---|---|---|---|---|---|
| 1 | Horizontal | 718 | X | 150 | 467 | | |
|   | Horizontal | 721 | ○ | 150 | 511 | X | Δ |
|   | Vertical | 717 | X | 150 | 438 | | |
|   | Vertical | 718 | ○ | 150 | 481 | | |
| 4 | Horizontal | 718 | X | 150 | 473 | | |
|   | Horizontal | 722 | ○ | 150 | 510 | ○ | ○ |
|   | Vertical | 717 | X | 150 | 444 | | |
|   | Vertical | 718 | ○ | 150 | 480 | | |
|   | Horizontal | 718 | X | 500 | 417 | | |
|   | Horizontal | 720 | ○ | 500 | 450 | | |
| 6 | Horizontal | 720 | X | 150 | 472 | | |
|   | Horizontal | 722 | ○ | 150 | 511 | X | Δ |
|   | Vertical | 716 | X | 150 | 443 | | |
|   | Vertical | 723 | ○ | 150 | 478 | | |
| 7 | Horizontal | 724 | X | 150 | 468 | | |
|   | Horizontal | 720 | ○ | 150 | 510 | ○ | ○ |
|   | Vertical | 717 | X | 150 | 442 | | |
|   | Vertical | 721 | ○ | 150 | 481 | | |

<Evaluation Method>

The evaluation of the moldability was determined based on the presence or absence of underfill in the respective portions of the product, that is, the dimensions of the outer surface for which the compression and the like of a material during the design of the mold had been taken into account. The moldability was evaluated to be "X" when the difference exceeded ±2% of the dimensions; the moldability was evaluated to be "Δ" when the difference was within ±2%; the moldability was evaluated to be "O" when the difference was within ±1%; and efforts were made to obtain moldability of at least Δ.

The cutting status of cutting was evaluated as three levels as follows. When chips were segmented, the cutting resistance was low, no defects were observed on the product surface, and the forging material was cut with no problem, the cutting was evaluated to be "O"; when chips were continuous, the cutting therefore the chips were entangled with tools so as to cause a problem, and, in actual production, the forged parts were determined to be not applicable to cutting. There was a tendency in finishing cutting of chips to be continuously generated, but the amount of the cutting processing was small, and therefore chips were not entangled with tools, and there was no problem with products.

<The Influence of the Forging Load>

The influence of the forging load will be described with reference to Table 3.

the presence or absence of underfill in the respective portions of the product, the presence or absence of surface defects such as blushing and protrusions and recesses (which is abstractive, but refers to surface defects being generated on forged parts), and the dimensions of the respective portions of the product when the degree of uneven thickness C was 0%, and, the moldability was evaluated to be "X" when the difference exceeded ±2% of the dimensions; the moldability was evaluated to be "Δ" when the difference was within ±2%; the moldability was evaluated to be "O" when the difference was

TABLE 3

| Alloy No. | Area ratios of the respective phases in forged part | | | Area ratio of α phase immediately before forging % | *1 720° C. α phase % | *2 Type of forging material B, c | Average crystal grain diameter of forging material μm | Forging material | | | | | Forging result | | |
|---|---|---|---|---|---|---|---|---|---|---|---|---|---|---|---|
| | α phase % | β+γ+μ % | κ phase % | | | | | Tube axis direction length mm | Average thickness mm | Tube axis direction length/average thickness | Degree of uneven thickness % | *3 | Forging temperature ° C. | Moldability | Forging load ton |
| 1 | 93 | 7 | | 44 | | B | 40 | 22 | 8.25 | 2.7 | 0 | 45.9 | 724 | X | 25 |
| | | | | | | | | 22 | 8.25 | 2.7 | 0 | 45.9 | 720 | X | 50 |
| | | | | | | | | 22 | 8.25 | 2.7 | 0 | 45.9 | 715 | Δ | 75 |
| | | | | | | | | 22 | 8.25 | 2.7 | 0 | 45.9 | 726 | O | 100 |
| | | | | | | | | 22 | 8.25 | 2.7 | 0 | 45.9 | 722 | O | 125 |
| 2 | 84 | 16 | | 29 | | B | 25 | 22 | 8.25 | 2.7 | 0 | 45.9 | 717 | X | 25 |
| | | | | | | | | 22 | 8.25 | 2.7 | 0 | 45.9 | 721 | X | 50 |
| | | | | | | | | 22 | 8.25 | 2.7 | 0 | 45.9 | 716 | O | 75 |
| | | | | | | | | 22 | 8.25 | 2.7 | 0 | 45.9 | 718 | O | 100 |
| | | | | | | | | 22 | 8.25 | 2.7 | 0 | 45.9 | 722 | O | 125 |
| 3 | 92 | 8 | | 39 | 41 | B | 30 | 22 | 8.25 | 2.7 | 0 | 45.9 | 720 | X | 25 |
| | | | | | | | | 22 | 8.25 | 2.7 | 0 | 45.9 | 714 | X | 50 |
| | | | | | | | | 22 | 8.25 | 2.7 | 0 | 45.9 | 722 | Δ | 75 |
| | | | | | | | | 22 | 8.25 | 2.7 | 0 | 45.9 | 716 | O | 100 |
| | | | | | | | | 22 | 8.25 | 2.7 | 0 | 45.9 | 715 | O | 125 |
| 4 | 59 | 2 | 39 | 38 | 40 | B | 15 | 22 | 8.25 | 2.7 | 0 | 45.9 | 718 | X | 25 |
| | | | | | | | | 22 | 8.25 | 2.7 | 0 | 45.9 | 722 | X | 50 |
| | | | | | | | | 22 | 8.25 | 2.7 | 0 | 45.9 | 720 | X | 75 |
| | | | | | | | | 22 | 8.25 | 2.7 | 0 | 45.9 | 714 | O | 100 |
| | | | | | | | | 22 | 8.25 | 2.7 | 0 | 45.9 | 716 | O | 125 |
| 5 | 81 | 19 | | — | 26 | C | 1000 | 22 | 8.25 | 2.7 | 0 | 45.9 | 715 | X | 25 |
| | | | | | | | | 22 | 8.25 | 2.7 | 0 | 45.9 | 719 | X | 50 |
| | | | | | | | | 22 | 8.25 | 2.7 | 0 | 45.9 | 721 | Δ | 75 |
| | | | | | | | | 22 | 8.25 | 2.7 | 0 | 45.9 | 714 | O | 100 |
| | | | | | | | | 22 | 8.25 | 2.7 | 0 | 45.9 | 719 | O | 125 |
| 6 | 94 | 6 | | 44 | 46 | C | 120 | 22 | 8.25 | 2.7 | 0 | 45.9 | 720 | X | 25 |
| | | | | | | | | 22 | 8.25 | 2.7 | 0 | 45.9 | 716 | X | 50 |
| | | | | | | | | 22 | 8.25 | 2.7 | 0 | 45.9 | 722 | X | 75 |
| | | | | | | | | 22 | 8.25 | 2.7 | 0 | 45.9 | 724 | O | 100 |
| | | | | | | | | 22 | 8.25 | 2.7 | 0 | 45.9 | 721 | O | 125 |
| 7 | 58 | 1 | 41 | 42 | 43 | C | 30 | 22 | 8.25 | 2.7 | 0 | 45.9 | 717 | X | 25 |
| | | | | | | | | 22 | 8.25 | 2.7 | 0 | 45.9 | 718 | X | 50 |
| | | | | | | | | 22 | 8.25 | 2.7 | 0 | 45.9 | 722 | X | 75 |
| | | | | | | | | 22 | 8.25 | 2.7 | 0 | 45.9 | 714 | O | 100 |
| | | | | | | | | 22 | 8.25 | 2.7 | 0 | 45.9 | 726 | O | 125 |

*1 The area ratio of the α phase in a specimen produced by heating a hot-forged part at approximately 720° C., holding the part for one minute, and rapidly cooling the part using water
*2 Regarding the type of the forging material, B represents a hot-extruded tube, and C represents a continuous cast tube.
*3 $75 \times 1/(\text{tube axis direction length/average thickness})^{1/2}$ Extruded tubes and continuous cast tubes having an outer diameter of 76.5 mm and a thickness of 15 mm were made into a shape having an outer diameter of 72.5 mm, a thickness of 8.25 mm and a degree of uneven thickness of 0% through a mechanical process, and the moldability was evaluated with a load changed during forging. The forging material had a length of 22 mm and a weight of approximately 311 g.

Forging was carried out using a forging machine having a hot forging press capacity of 500 tons with a press load limited to 5%, 10%, 15%, 20% and 25% of the press capacity (when converted into a load, 25 tons, 50 tons, 75 tons, 100 tons and 125 tons). The moldability was evaluated based on within ±1%; and efforts were made to obtain moldability of at least Δ.

The invention alloys with an alloy No. were all insufficiently molded when the forging load was 50 tons or less, but all the invention alloys could be molded at a load of 100 tons or less. Therefore, the forging load can be reduced to ⅔ from the minimum forging load of 150 tons (refer to Table 2) in a case in which the forged parts are forged using the above-described rod.

<The Influence of the Weight of the Forging Material>

The influence of the weight of the forging material will be described with reference to Table 4.

TABLE 4

| Alloy No. | Area ratios of the respective phases in forged part | | | Area ratio of α phase immediately before forging % | *1 720° C. α phase % | *2 Type of forging material B, C | Average crystal grain diameter of forging material μm | Forging material | | | | Forging result | | | |
|---|---|---|---|---|---|---|---|---|---|---|---|---|---|---|---|
| | α phase % | β + γ + μ % | κ phase % | | | | | Tube axis direction length mm | Av- erage thick- ness mm | Tube axis direction length/ average thickness | Degree of uneven thickness % | *3 | Forging temper- ature ° C. | Mold- abil- ity | Forging load | Weight g |
| 1 | 93 | 7 | | 44 | | B | 40 | 23 | 8.25 | 2.8 | 0 | 44.9 | 724 | ○ | ○ | 326 |
| | | | | | | | | 22 | 8.25 | 2.7 | 0 | 45.9 | 720 | ○ | Δ | 312 |
| | | | | | | | | 21 | 8.25 | 2.5 | 0 | 47.0 | 719 | Δ | ○ | 297 |
| 2 | 84 | 16 | | 29 | | B | 25 | 23 | 8.25 | 2.8 | 0 | 44.9 | 720 | ○ | Δ | 327 |
| | | | | | | | | 22 | 8.25 | 2.1 | 0 | 45.9 | 717 | ○ | Δ | 310 |
| | | | | | | | | 21 | 8.25 | 2.5 | 0 | 47.0 | 726 | Δ | Δ | 298 |
| 3 | 92 | 8 | | 39 | 41 | B | 30 | 23 | 8.25 | 2.8 | 0 | 44.9 | 720 | ○ | ○ | 325 |
| | | | | | | | | 22 | 8.25 | 2.7 | 0 | 45.9 | 715 | ○ | Δ | 310 |
| | | | | | | | | 21 | 8.25 | 2.5 | 0 | 47.0 | 726 | Δ | Δ | 297 |
| 4 | 59 | 2 | 39 | 38 | 40 | B | 15 | 23 | 8.25 | 2.8 | 0 | 44.9 | 718 | ○ | ○ | 324 |
| | | | | | | | | 22 | 8.25 | 2.7 | 0 | 45.9 | 724 | ○ | Δ | 311 |
| | | | | | | | | 21 | 8.25 | 2.5 | 0 | 47.0 | 716 | Δ | ○ | 295 |
| 5 | 81 | 19 | | — | 26 | C | 1000 | 23 | 8.25 | 2.8 | 0 | 44.9 | 715 | ○ | Δ | 323 |
| | | | | | | | | 22 | 8.25 | 2.7 | 0 | 45.9 | 726 | ○ | Δ | 309 |
| | | | | | | | | 21 | 8.25 | 2.5 | 0 | 47.0 | 718 | Δ | ○ | 295 |
| 6 | 94 | 6 | | 44 | 46 | C | 120 | 23 | 8.25 | 2.8 | 0 | 44.9 | 720 | ○ | ○ | 323 |
| | | | | | | | | 22 | 8.25 | 2.7 | 0 | 45.9 | 724 | ○ | ○ | 312 |
| | | | | | | | | 21 | 8.25 | 2.5 | 0 | 47.0 | 713 | Δ | ○ | 298 |
| 7 | 58 | 1 | 41 | 42 | 43 | C | 30 | 23 | 8.25 | 2.8 | 0 | 44.9 | 717 | ○ | ○ | 326 |
| | | | | | | | | 22 | 8.25 | 2.7 | 0 | 45.9 | 715 | ○ | ○ | 310 |
| | | | | | | | | 21 | 8.25 | 2.5 | 0 | 47.0 | 710 | Δ | ○ | 297 |

*1 The area ratio of the α phase in a specimen produced by heating a hot-forged part at approximately 720° C., holding the part for one minute, and rapidly cooling the part using water
*2 Regarding the type of the forging material, B represents a hot-extruded tube, and C represents a continuous cast tube.
*3 75 × 1/(tube axis direction length/average thickness)$^{1/2}$ A test was carried out with various lengths, that is, weights of the forging material. The weight of the material was set to three levels of approximately 325 g (length 23 mm), approximately 311 g (length 22 mm) and approximately 297 g (length 21 mm). A temperature of 720° C. was used as the standard temperature immediately before forging. The moldability was evaluated based on the presence or absence of underfill in the respective portions of the product, the presence or absence of surface defects such as blushing and protrusions and recesses, and the dimensions of the respective portions of the product when the degree of uneven thickness C was 0%, and, the moldability was evaluated to be "X" when the difference exceeded ±2% of the dimensions; the moldability was evaluated to be "Δ" when the difference was within ±2%; the moldability was evaluated to be "O" when the difference was within ±1%; and efforts were made to obtain moldability of at least Δ. The press load during hot forging was scanned, forged parts that could be molded at 130 tons or less were evaluated to be "Δ"; forged parts that could be molded at 110 tons or less were evaluated to be "O"; and forged parts that could be molded at an extremely low power of 90 tons or less were evaluated to be "A".

The moldability at a material weight of approximately 325 g and approximately 311 g is favorable. When the weight becomes approximately 297 g, the product dimensions are at the Δ level, but outside burrs are rarely generated, and therefore the weight may be considered to be the lower limit of the moldable material weight. Therefore, it becomes possible to reduce the material weight by approximately 40% from the minimum material weight of approximately 510 g which is valid in a case in which the rod carried out for comparison is horizontally placed and forged. All of Alloy Nos. 1 to 7 have a similar tendency, and are considered to have favorable moldability. The alloys can be molded with a low power. The forging load was influenced by the area ratio of the α phase during hot forging or the composition coefficient, and, as the area ratio of the α phase decreased, and as the composition coefficient decreased, there was a tendency in which the alloys could be forged at a smaller power.

<The Influence of the Uneven Thickness>

The influence of the uneven thickness of the forging material will be described with reference to Tables 5 and 6.

TABLE 5

| Alloy No. | Area ratios of the respective phases in forged part | | | Area ratio of α phase immediately before forging % | *1 720° C. α phase % | *2 Type of forging material B, C | Average crystal grain diameter of forging material μm | Forging material | | | | *3 |
|---|---|---|---|---|---|---|---|---|---|---|---|---|
| | α phase % | β + γ + μ % | κ phase % | | | | | Tube axis direction length mm | Average thickness mm | Tube axis direction length/ average thickness | Degree of uneven thickness % | |
| 1 | 93 | 7 | | 43 | | B | 40 | 22 | 8.25 | 2.7 | 5 | 45.9 |
| | | | | | | | | 22 | 8.25 | 2.7 | 10 | 45.9 |
| | | | | | | | | 22 | 8.25 | 2.7 | 15 | 45.9 |

TABLE 5-continued

| | | | | | | | 22 | 8.25 | 2.7 | 20 | 45.9 |
| | | | | | | | 22 | 8.25 | 2.7 | 30 | 45.9 |
| | | | | | | | 22 | 8.25 | 2.7 | 40 | 45.9 |
| 2 | 84 | 16 | | 29 | B | 25 | 22 | 8.25 | 2.7 | 5 | 45.9 |
| | | | | | | | 22 | 8.25 | 2.7 | 10 | 45.9 |
| | | | | | | | 22 | 8.25 | 2.7 | 15 | 45.9 |
| | | | | | | | 22 | 8.25 | 2.7 | 20 | 45.9 |
| | | | | | | | 22 | 8.25 | 2.7 | 30 | 45.9 |
| | | | | | | | 22 | 8.25 | 2.7 | 40 | 45.9 |
| 3 | 92 | 8 | | 39 | 41 | B | 30 | 22 | 8.25 | 2.7 | 5 | 45.9 |
| | | | | | | | 22 | 8.25 | 2.7 | 10 | 45.9 |
| | | | | | | | 22 | 8.25 | 2.7 | 15 | 45.9 |
| | | | | | | | 22 | 8.25 | 2.7 | 20 | 45.9 |
| | | | | | | | 22 | 8.25 | 2.7 | 30 | 45.9 |
| | | | | | | | 22 | 8.25 | 2.7 | 40 | 45.9 |
| 4 | 60 | 2 | 38 | 42 | 41 | B | 15 | 22 | 8.25 | 2.7 | 5 | 45.9 |
| | | | | | | | 22 | 8.25 | 2.7 | 10 | 45.9 |
| | | | | | | | 22 | 8.25 | 2.7 | 15 | 45.9 |
| | | | | | | | 22 | 8.25 | 2.7 | 20 | 45.9 |
| | | | | | | | 22 | 8.25 | 2.7 | 30 | 45.9 |
| | | | | | | | 22 | 8.25 | 2.7 | 40 | 45.9 |

| | | Forging result | | | | | | |
|---|---|---|---|---|---|---|---|---|
| | | Moldability | | | | | | |
| Alloy No. | Forging temperature °C. | a Bottom outer diameter | c Top outer diameter | h Bottom surface width | i Height | j Bottom inner diameter | k Top inner diameter | Forging load |
| 1 | 724 | ○ | ○ | ○ | ○ | ○ | ○ | A |
| | 720 | ○ | ○ | ○ | ○ | ○ | ○ | ○ |
| | 715 | ○ | ○ | ○ | ○ | ○ | ○ | ○ |
| | 720 | ○ | ○ | Δ | ○ | ○ | ○ | ○ |
| | 723 | ○ | ○ | Δ | ○ | ○ | ○ | ○ |
| | 715 | ○ | ○ | X | ○ | ○ | ○ | Δ |
| 2 | 717 | ○ | ○ | ○ | ○ | ○ | ○ | A |
| | 720 | ○ | ○ | ○ | ○ | ○ | ○ | A |
| | 715 | ○ | ○ | ○ | ○ | ○ | ○ | A |
| | 726 | ○ | ○ | ○ | ○ | ○ | ○ | A |
| | 718 | ○ | ○ | Δ | ○ | ○ | ○ | ○ |
| | 721 | ○ | ○ | X | ○ | ○ | ○ | ○ |
| 3 | 720 | ○ | ○ | ○ | ○ | ○ | ○ | A |
| | 723 | ○ | ○ | ○ | ○ | ○ | ○ | A |
| | 720 | ○ | ○ | ○ | ○ | ○ | ○ | ○ |
| | 716 | ○ | ○ | Δ | ○ | ○ | ○ | ○ |
| | 710 | ○ | ○ | Δ | ○ | ○ | ○ | ○ |
| | 716 | ○ | ○ | X | ○ | ○ | ○ | Δ |
| 4 | 718 | ○ | ○ | ○ | ○ | ○ | ○ | A |
| | 716 | ○ | ○ | ○ | ○ | ○ | ○ | ○ |
| | 720 | ○ | ○ | ○ | ○ | ○ | ○ | ○ |
| | 714 | ○ | ○ | Δ | ○ | ○ | ○ | ○ |
| | 719 | ○ | ○ | Δ | ○ | ○ | ○ | ○ |
| | 724 | ○ | ○ | X | ○ | ○ | ○ | Δ |

*1 The area ratio of the α phase in a specimen produced by heating a hot-forged part at approximately 720° C., holding the part for one minute, and rapidly cooling the part using water
*2 Regarding the type of the forging material, B represents a hot-extruded tube, and C represents a continuous cast tube.
*3 75 × 1/(tube axis direction length/average thickness)$^{1/2}$

TABLE 6

| | Area ratios of the respective phases in forged part | | | Area ratio of α phase immediately before forging % | *1 720° C. α phase % | *2 Type of forging material B, C | Average crystal grain diameter of forging material μm | Forging material | | | |
|---|---|---|---|---|---|---|---|---|---|---|---|
| Alloy No. | α phase % | β + γ + μ % | κ phase % | | | | | Tube axis direction length mm | Average thickness mm | Tube axis direction length/ average thickness | Degree of uneven thickness % | *3 |
| 5 | 82 | 18 | | | 26 | C | 1000 | 22 | 8.25 | 2.7 | 5 | 45.9 |
| | | | | | | | | 22 | 8.25 | 2.7 | 10 | 45.9 |
| | | | | | | | | 22 | 8.25 | 2.7 | 15 | 45.9 |
| | | | | | | | | 22 | 8.25 | 2.7 | 20 | 45.9 |
| | | | | | | | | 22 | 8.25 | 2.7 | 30 | 45.9 |
| | | | | | | | | 22 | 8.25 | 2.7 | 40 | 45.9 |

TABLE 6-continued

| | | | | | | | | | | | |
|---|---|---|---|---|---|---|---|---|---|---|---|
| 6 | 94 | 6 | | 43 | 43 | C | 120 | 22 | 8.25 | 2.7 | 5 | 45.9 |
| | | | | | | | | 22 | 8.25 | 2.7 | 10 | 45.9 |
| | | | | | | | | 22 | 8.25 | 2.7 | 15 | 45.9 |
| | | | | | | | | 22 | 8.25 | 2.7 | 20 | 45.9 |
| | | | | | | | | 22 | 8.25 | 2.7 | 30 | 45.9 |
| | | | | | | | | 22 | 8.25 | 2.7 | 40 | 45.9 |
| 7 | 58 | 1 | 41 | 42 | 45 | C | 30 | 22 | 8.25 | 2.7 | 5 | 45.9 |
| | | | | | | | | 22 | 8.25 | 2.7 | 10 | 45.9 |
| | | | | | | | | 22 | 8.25 | 2.7 | 15 | 45.9 |
| | | | | | | | | 22 | 8.25 | 2.7 | 20 | 45.9 |
| | | | | | | | | 22 | 8.25 | 2.7 | 30 | 45.9 |
| | | | | | | | | 22 | 8.25 | 2.7 | 40 | 45.9 |

| | | Forging result | | | | | | |
|---|---|---|---|---|---|---|---|---|
| | | | Moldability | | | | | |
| Alloy No. | Forging temperature °C. | a Bottom outer diameter | c Top outer diameter | h Bottom surface width | i Height | j Bottom inner diameter | k Top inner diameter | Forging load |
| 5 | 715 | ○ | ○ | ○ | ○ | ○ | ○ | A |
| | 720 | ○ | ○ | ○ | ○ | ○ | ○ | A |
| | 711 | ○ | ○ | Δ | ○ | ○ | ○ | A |
| | 713 | ○ | ○ | Δ | ○ | ○ | ○ | ○ |
| | 725 | ○ | ○ | Δ | ○ | ○ | ○ | ○ |
| | 720 | ○ | ○ | X | ○ | ○ | ○ | ○ |
| 6 | 720 | ○ | ○ | ○ | ○ | ○ | ○ | ○ |
| | 720 | ○ | ○ | ○ | ○ | ○ | ○ | ○ |
| | 716 | ○ | ○ | ○ | ○ | ○ | ○ | ○ |
| | 724 | ○ | ○ | Δ | ○ | ○ | ○ | ○ |
| | 721 | ○ | ○ | Δ | ○ | ○ | ○ | Δ |
| | 716 | ○ | ○ | X | ○ | ○ | ○ | Δ |
| 7 | 717 | ○ | ○ | ○ | ○ | ○ | ○ | ○ |
| | 719 | ○ | ○ | ○ | ○ | ○ | ○ | ○ |
| | 726 | ○ | ○ | ○ | ○ | ○ | ○ | ○ |
| | 713 | ○ | ○ | Δ | ○ | ○ | ○ | ○ |
| | 711 | ○ | ○ | Δ | ○ | ○ | ○ | Δ |
| | 720 | ○ | ○ | X | ○ | ○ | ○ | Δ |

*1 The area ratio of the α phase in a specimen produced by heating a hot-forged part at approximately 720° C., holding the part for one minute, and rapidly cooling the part using water
*2 Regarding the type of the forging material, B represents a hot-extruded tube, and C represents a continuous cast tube.
*3 75 × 1/(tube axis direction length/average thickness)$^{1/2}$ Specimens having an outer diameter of 72.5 mm, an inner diameter of 56 mm and an intentionally-provided uneven thickness were prepared by cutting extruded tubes and continuous cast tubes which had an outer diameter of 76.5 mm and a thickness of 15 mm, and forged using a forging machine having a hot forging press capacity of 150 tons. The forging material had a length of 22 mm and a weight of approximately 311 g. A weight of 311 g is approximately 60% of approximately 510 g which is the weight necessary to forge a forging material into predetermined dimensions when the forging material is a rod.

The press load during hot forging was scanned, forged parts that could be molded at 130 tons or less were evaluated to be "Δ"; forged parts that could be molded at 110 tons or less were evaluated to be "O"; and forged parts that could be molded at an extremely low power of 90 tons or less were evaluated to be "A".

Since the thickness was almost even in the tube axis direction, the degree of uneven thickness of the forging material was measured on the end surface of the forging material. Thicknesses in eight directions along the circumferential direction of the forging material, that is, thicknesses of the forged part at angular intervals of 22.5° were measured. The degree of uneven thickness was computed using a formula ((1−(minimum thickness/maximum thickness))×100) %.

Dimensions of the six places (a, c, h, i, j and k) illustrated in FIG. 1 were measured in eight directions along the circumferential direction of the forging material, that is, at angular intervals of 22.5°, and the moldability was evaluated as described below from the measured values.

The moldability was evaluated by comparing the forged part with a forged part having a degree of uneven thickness of 0%. The moldability was based on the dimensions of the respective portions when the degree of uneven thickness C was 0%, and, the moldability was evaluated to be "X" when the difference exceeded ±2% of the dimensions; the moldability was evaluated to be "Δ" when the difference was within ±2%; the moldability was evaluated to be "O" when the difference was within ±1%; and efforts were made to obtain moldability of at least Δ.

In the respective alloys, the influence of the uneven thickness on the forging load was rarely observed, and the load during forging was significantly influenced by the area ratio of the α phase during forging or the composition coefficient. When the degree of uneven thickness reached 40%, the variation of the dimension at the h portion among the dimension measurement places of the forged part exceeded 2%, but there was no influence of the uneven thickness in the other portions. Therefore, in Alloy Nos. 1 to 7, when the degree of uneven thickness was 30% or less, it was possible to forge the alloys with a predetermined accuracy. It was found that, in order to obtain higher dimensional accuracy, the degree of uneven thickness needed to be 15% or less. In Alloy No. 5 which did not contain Si, the size of the crystal grains were coarsened to be 1000 μm, and therefore there was an influence of the crystal grains, and the degree of uneven thickness needed to be 10% or less; however, in Alloy No. 2 which contained a small amount of Si, forged parts having high dimensional accuracy could be obtained at a degree of uneven thickness of 20% as well. The forging loads of Alloy Nos. 1 to 7 were influenced by the area ratio of the α phase during hot forging and the composition coefficient, and, as the area ratio of the α phase decreased, and as the composition coefficient decreased, there was a tendency in which the forged parts could be forged at a smaller power. Regarding the forging load as well, in Alloy No. 5, since the size of the crystal grains in the forging material were coarsened to be 1000 μm, therefore it is considered that there was an influence of the crystal grains.

<The Influence of the Forging Temperature>

The influence of the forging temperature will be described with reference to Table 7.

Forging was carried out at forging temperatures of approximately 620° C. and approximately 820° C. which were outside the appropriate temperature range of 650° C. to 800° C. The moldability was evaluated based on the presence or absence of underfill in the respective portions of the product, the presence or absence of surface defects such as blushing and protrusions and recesses, and the dimensions of the respective portions of the product when the degree of uneven thickness C was 0%, and, the moldability was evaluated to be "X" when the difference exceeded ±2% of the dimensions; the moldability was evaluated to be "Δ" when the difference was within ±2%; the moldability was evaluated to be "O" when the difference was within ±1%; and efforts were made to obtain moldability of at least A. The press load during hot forging was scanned, forged parts that required 130 tons or more were evaluated to be "X"; forged parts that could be molded at 130 tons or less were evaluated to be "Δ"; forged parts that could be molded at 110 tons or less were evaluated to be "O"; and forged parts that could be molded at an extremely low power of 90 tons or less were evaluated to be "A".

In a case in which the forging temperature was approximately 620° C., all of Alloy Nos. 2, 3, 4 and 5 were evaluated to be "X" in terms of the forging load, and to be "X" or "Δ" in terms of the moldability.

In a case in which the forging temperature was approximately 800° C., all of Alloy Nos. 2, 3, 4 and 5 were evaluated to be "A" in terms of the forging load, and to be "X" in terms of the moldability.

As described above, when the forging temperature is outside the range of 650° C. to 800° C., favorable forging is not possible.

TABLE 7

| Alloy No. | Area ratios of the respective phases in forged part | | | Area ratio of α phase immediately before forging % | *1 720° C. α phase % | *2 Type of forging material B, C | Average crystal grain diameter of forging material μm | Forging material | | | | Degree of uneven thickness % | *3 | Forging result | | | |
|---|---|---|---|---|---|---|---|---|---|---|---|---|---|---|---|---|---|
| | α phase % | β+γ+μ % | κ phase % | | | | | Tube axis direction length mm | Average thickness mm | Tube axis length/ average thickness | | | | Forging temperature °C. | Moldability | Forging load | Weight g |
| 2 | 85 | 15 | | 2 | 31 | B | | 22 | 8.25 | 2.7 | | 0 | 45.9 | 824 | X | A | 312 |
| | 88 | 12 | | 57 | 30 | | | 22 | 8.25 | 2.7 | | 0 | 45.9 | 620 | Δ | X | 310 |
| 3 | 91 | 9 | | 6 | 42 | B | | 22 | 8.25 | 2.7 | | 0 | 45.9 | 825 | X | A | 313 |
| | 93 | 7 | | 77 | 43 | | | 22 | 8.25 | 2.7 | | 0 | 45.9 | 628 | X | X | 312 |
| 4 | 57 | 3 | 40 | 9 | 41 | B | | 22 | 8.25 | 2.7 | | 0 | 45.9 | 824 | X | A | 309 |
| | 60 | 3 | 37 | 77 | 44 | | | 22 | 8.25 | 2.7 | | 0 | 45.9 | 627 | X | X | 311 |
| 5 | 83 | 17 | | 1 | 27 | C | 1000 | 22 | 8.25 | 2.7 | | 0 | 45.9 | 819 | X | A | 310 |
| | 84 | 16 | | 55 | 28 | | | 22 | 8.25 | 2.7 | | 0 | 45.9 | 625 | Δ | X | 312 |

*1 The area ratio of the α phase in a specimen produced by heating a hot-forged part at approximately 720° C., holding the part for one minute, and rapidly cooling the part using water
*2 Regarding the type of the forging material, B represents a hot-extruded tube, and C represents a continuous cast tube.
*3 75 × 1/(tube axis direction length/average thickness)$^{1/2}$ <The Influence of the Shape of the Mold and the Material>

In the respective tests described above, forging was carried out using a mold intended to produce forged parts having the shape illustrated in FIG. 1 (this mold will be appropriately referred to as standard mold); however, using eight molds intended to produce forged parts having different shapes from the standard mold (Molds 1 to 8), the influences of dimension factors of the molds on the moldability of forging were investigated. The dimension factors of the material were investigated by using three materials having different dimensions for the eight molds.

Table 8 describes the dimensions of the forged parts targeted by the respective molds. In Table 8, the respective signs of a, c, k, i, i1, i2 and j represent the respective places in FIG. 1. Table 9 describes the dimensions of the specimens (materials) used in the respective molds.

TABLE 8

| | Outer diameter DO a,c mm | Inner diameter DI1 k mm | Length of forged part L i mm | Partial length 1 i1 mm | Partial length 2 i2 mm | Inner diameter 2 DI2 j mm | Average inner diameter DI mm | Average Thickness T mm | DI/DO | T/DO | L/T |
|---|---|---|---|---|---|---|---|---|---|---|---|
| Standard mold | 77 | 70 | 25 | 15 | 10 | 56 | 64.8 | 6.1 | 0.841 | 0.079 | 4.09 |
| Mold 1 | 77 | 70 | 50 | 40 | 10 | 56 | 67.4 | 4.8 | 0.876 | 0.062 | 10.45 |
| Mold 2 | 77 | 70 | 40 | 30 | 10 | 56 | 66.8 | 5.1 | 0.867 | 0.066 | 7.82 |

TABLE 8-continued

|  | Outer diameter DO a.c mm | Inner diameter DI1 k mm | Length of forged part L i mm | Partial length 1 i1 mm | Partial length 2 i2 mm | Inner diameter 2 DI2 j mm | Average inner diameter DI mm | Average Thickness T mm | DI/DO | T/DO | L/T |
|---|---|---|---|---|---|---|---|---|---|---|---|
| Mold 3 | 77 | 60 | 9.5 | 4.5 | 5 | 56 | 57.9 | 9.5 | 0.752 | 0.124 | 1.00 |
| Mold 4 | 77 | 60 | 12.5 | 7.5 | 5 | 56 | 58.4 | 9.3 | 0.759 | 0.121 | 1.35 |
| Mold 5 | 77 | 60 | 15 | 10 | 5 | 56 | 58.7 | 9.2 | 0.762 | 0.119 | 1.64 |
| Mold 6 | 77 | 32 | 25 | 15 | 10 | 28 | 30.5 | 23.3 | 0.396 | 0.302 | 1.07 |
| Mold 7 | 77 | 36 | 25 | 15 | 10 | 28 | 33.0 | 22.0 | 0.429 | 0.285 | 1.14 |
| Mold 8 | 77 | 60 | 40 | 30 | 10 | 56 | 59.0 | 9.0 | 0.767 | 0.117 | 4.45 |

TABLE 9

| Mold name | (Material) specimen No. | Average outer diameter mm | Average inner diameter mm | Average thickness mm | Tube axis direction length mm | (Average inner diameter)/ average outer diameter | (Average thickness)/ average outer diameter | (Tube axis direction length/ average thickness | *1 |
|---|---|---|---|---|---|---|---|---|---|
| Standard mold | M0 | 72.5 | 56 | 8.25 | 22 | 0.772 | 0.114 | 2.67 | 45.9 |
| Mold 1 | M1 | 72.5 | 56 | 8.25 | 35 | 0.772 | 0.114 | 4.24 | 36.4 |
| Mold 2 | M2 | 72.5 | 56 | 8.25 | 29.7 | 0.772 | 0.114 | 3.60 | 39.5 |
| Mold 3 | M3 | 72.5 | 56 | 8.25 | 12.4 | 0.772 | 0.114 | 1.50 | 61.2 |
| Mold 4 | M4 | 72.5 | 56 | 8.25 | 15.9 | 0.772 | 0.114 | 1.93 | 54.0 |
| Mold 5 | M5 | 72.5 | 56 | 8.25 | 18.8 | 0.772 | 0.114 | 2.28 | 49.7 |
| Mold 6 | M6 | 72.5 | 28 | 22.25 | 30 | 0.386 | 0.307 | 1.35 | 64.6 |
| Mold 7 | M7 | 72.5 | 28 | 22.25 | 29 | 0.386 | 0.307 | 1.30 | 65.7 |
| Mold 8 | M81 | 67.9 | 56 | 5.95 | 71.5 | 0.825 | 0.088 | 12.02 | 21.6 |
|  | M82 | 70 | 56 | 7 | 59.2 | 0.800 | 0.100 | 8.50 | 25.7 |
|  | M83 | 72 | 56 | 8 | 51.2 | 0.778 | 0.111 | 6.40 | 29.6 |

*1 75 × 1/(tube axis direction length/average thickness)$^{1/2}$

The specimens tested in Molds 1 to 5 were specimens that had been produced in the same actual machine as the specimens with which the moldability, load and various characteristics of forging had been investigated using the standard mold of FIG. 1, but had different lengths from one another. The specimen used in the test of Mold 8 was obtained by finishing the outer diameter of the specimen used in the standard mold of FIG. 1 in a lathe to predetermined dimensions. The specimens used in Molds 6 and 7 were obtained by finishing the inner diameter of a continuous cast tube having an outer diameter of 72.5 mm and a thickness of 23.0 mm through lathe-turning to predetermined dimensions. The alloys of Alloy Nos. 1, 2, 4, 6 and 7 were used as the respective specimens.

Table 10 describes the forging temperatures, the moldability and the degrees of uneven thickness of the respective tests.

TABLE 10

|  |  | Alloy No. 1 Kind of forging material B*1 | | | Alloy No. 2 Kind of forging material B*1 | | | Alloy No.4 Kind of forging material B*1 | | |
|---|---|---|---|---|---|---|---|---|---|---|
| Mold name | Specimen No. | Forging temperature | Mold-ability | Degree of uneven thickness (%) | Forging temperature | Mold-ability | Degree of uneven thickness (%) | Forging temperature | Mold-ability | Degree of uneven thickness (%) |
| Standard mold | M0 | 724 | ○ | 10 | 717 | ○ | 18 | 718 | ○ | 8 |
| Mold 1 | M1 | 723 | X | 10 | 722 | X | 18 | 719 | X | 8 |
| Mold 2 | M2 | 724 | ○ | 10 | 719 | ○ | 18 | 722 | ○ | 8 |
| Mold 3 | M3 | 718 | Δ | 10 | 716 | Δ | 18 | 720 | ○ | 8 |
| Mold 4 | M4 | 717 | ○ | 10 | 722 | Δ | 18 | 716 | ○ | 8 |
| Mold 5 | M5 | 716 | ○ | 10 | 720 | ○ | 18 | 722 | ○ | 8 |
| Mold 6 | M6 | — | — | — | — | — | — | — | — | — |
| Mold 7 | M7 | — | — | — | — | — | — | — | — | — |

TABLE 10-continued

| Mold | M81 | 718 | X | 16 | 720 | X | 28 | 718 | X | 13 |
|------|-----|-----|---|----|-----|---|----|-----|---|----|
| 8 | M82 | 719 | Δ | 13 | 722 | X | 26 | 720 | Δ | 10 |
|  | M83 | 721 | ○ | 11 | 719 | ○ | 18 | 721 | ○ | 8 |

| | Alloy No. 6 Kind of forging material C*1 | | | Alloy No. 7 Kind of forging material C*1 | | |
|---|---|---|---|---|---|---|
| Mold name | Forging temperature | Mold-ability | Degree of uneven thickness (%) | Forging temperature | Mold-ability | Degree of uneven thickness (%) |
| Standard mold | 720 | ○ | 14 | 717 | ○ | 6 |
| Mold 1 | 717 | X | 14 | 724 | X | 6 |
| Mold 2 | 718 | ○ | 14 | 720 | ○ | 6 |
| Mold 3 | 720 | X | 14 | 720 | Δ | 6 |
| Mold 4 | 718 | Δ | 14 | 718 | ○ | 6 |
| Mold 5 | 722 | ○ | 14 | 722 | ○ | 6 |
| Mold 6 |  | X | 1 | 723 | X | 2 |
| Mold 7 |  | Δ | 3 | 724 | ○ | 1 |
| Mold 8 | 716 | X | 22 | 720 | X | 11 |
|  | 723 | Δ | 17 | 718 | ○ | 9 |
|  | 718 | ○ | 14 | 723 | ○ | 7 |

*2 Regarding the type of the forging material, B represents a hot-extruded tube, and C represents a continuous cast tube.

The moldability was evaluated based on the presence or absence of underfill in the respective portions of the product, the presence or absence of surface defects such as blushing and protrusions and recesses, and the dimensions of the outside surfaces for which the contraction and the like of a material had been considered during the designing of a mold. The moldability was evaluated to be "X" when the difference exceeded ±2%; the moldability was evaluated to be "Δ" when the difference was within ±2%; the moldability was evaluated to be "O" when the difference was within ±1%; and efforts were made to obtain moldability of at least Δ.

When the length/average thickness (L/T) of the forged part exceeded 10, the moldability was also poor in all the forged parts (Mold 1), and, when the length/average thickness became approximately 7.8, the moldability became favorable in all the specimens (Mold 2). In contrast, when the L/T becomes approximately 1.00, the moldability is not acceptable in Alloy No. 6 having a slightly large degree of uneven thickness, but the moldability becomes A in other alloys so as to be acceptable (Mold 3). When the length of the material decreases (the length of the material used at that time is 12.4 mm), and the material is cut using a saw having a thickness of 3 mm (which is an ordinary thickness for the cutting of tubular materials), the ratio of chips to the length of the material increases, and the yield rate is low (Mold 3). The L/T of the forged part becomes approximately 1.3 or 1.6, the moldability becomes favorable, and the yield rate is also improved (Molds 4 and 5).

When the average inner diameter/average outer diameter of the material is below 0.4, a shape having a weak effect of the near net shape is formed, and the moldability is poor (Molds 6 and 7). When the average inner diameter/average outer diameter exceeds 0.4, the moldability is improved.

With Mold 8, the influence of the tube axis direction length/average thickness of the material was investigated. When the tube axis direction length/average thickness exceeded 12, the forged part was poorly molded, which all resulted from bending (Specimen No. M81). Even when the tube axis direction length/average thickness was 8.5, another limitation of the degree of uneven thickness: the degree of uneven thickness≤75×1/(tube axis direction length/average thickness)$^{1/2}$ was not satisfied, and therefore the specimen having a large degree of uneven thickness was poorly molded (Specimen No. M82), and, when the tube axis direction length/average thickness became 6.4, favorable moldability was exhibited (Specimen No. M83).

<The Evaluation of Forged Parts Using Materials Manufactured with an Actual Production Facility>

The forgeability and a variety of characteristics were evaluated using hot-extruded tubes and continuous cast tubes which had been manufactured using an actual production facility. Nominally, forged materials cut out from the hot-extruded tubes and the continuous cast tubes which had an outer diameter of 72.5 mm and a thickness of 8.25 mm were forged using a forging machine having a hot forging press capacity of 500 tons. Since two samples were arbitrarily sampled from each of the compositions, not only the degree of uneven thickness but also the degree of roundness were somewhat different in the respective materials, but the weight of the forging material was set to become approximately 311 g. The cooling rate after hot forging was 4° C./second in a temperature range of the temperature of the forged part when forging ended to 300° C.

When the allowance of the degree of uneven thickness is computed using the allowance of the thickness of the extruded tube regulated by JIS, a degree of uneven thickness of up to 14.8% is allowed. In extruded tubes in an actual manufacturing process, there is a tendency that the degree of uneven thickness is poor on the top portion (front top) side of the extruded material, and the uneven thickness improves toward the tail portion. The degree of uneven thickness on the top side is influenced by materials, dimensions and extrusion conditions, and there are cases in which the degree of uneven thickness exceeds 30%. Generally, portions with a degree of uneven thickness of more than 30% are disposed of when cutting products, and are thus not made into a product. The degree of uneven thickness of continuous cast tubes is influenced not only by the process accuracy of a carbon mold but also by the wear of the mold due to long-term casting, and, in a case in which a material is horizontally cast, the amounts of compression caused by solidification are different on the top and bottom surfaces. The degree of uneven thickness is a maximum of approximately 20%. The forging materials were forged after the forging materials were arbitrarily sampled in an actual manufacturing process so as to obtain two degrees of uneven thickness, and the degrees of uneven thickness were confirmed.

During hot forging, the press load was scanned, forged parts that required 130 tons or more for molding were evaluated to be "X"; forged parts that required 130 tons or less for molding were evaluated to be "Δ"; forged parts that required 110 tons or less for molding were evaluated to be "O"; and forged parts that required an extremely low power of 90 tons or less for molding were evaluated to be "A".

The moldability was evaluated based on the presence or absence of underfill in the respective portions of the product, the presence or absence of surface defects such as blushing and protrusions and recesses, and the dimensions of the respective portions of the product with a degree of uneven thickness C of 0%. The moldability was evaluated to be "X" when the difference exceeded ±2%; the moldability was evaluated to be "Δ" when the difference was within ±2%; the moldability was evaluated to be "O" when the difference was within ±1%, and efforts were made to obtain moldability of at least Δ.

Tables 11, 12 and 13 describe the characteristics of the forged parts manufactured using Alloy Nos. 1 to 7, 21 to 33 and 101 to 114 in an actual manufacturing facility. Mass production test Nos. are given to the respective tests.

TABLE 11

| Alloy No. | Mass production test No. | Area ratios of the respective phases in forged part | | | Area ratio of α phase immediately before forging % | *1 720° C. α phase % | Hardness after forging HV | *2 Type of forging material B, C | Average crystal grain diameter of forging material μm | Forging material | | | | |
|---|---|---|---|---|---|---|---|---|---|---|---|---|---|---|
| | | α phase % | β + γ + μ % | κ phase % | | | | | | Tube axis direction length mm | Average thickness mm | Tube axis direction length/average thickness | Degree of uneven thickness % | *3 |
| 1 | P1 | 92 | 8 | | 43 | — | 84 | B | 40 | 22 | 8.25 | 2.7 | 10 | 45.6 |
| | P2 | | | | | | | | | 22 | 8.25 | 2.7 | 22 | 45.6 |
| 2 | P3 | 84 | 16 | | 29 | — | 96 | B | 25 | 22 | 8.25 | 2.7 | 18 | 45.6 |
| | P4 | | | | | | | | | 22 | 8.25 | 2.7 | 26 | 45.6 |
| 3 | P5 | 91 | 9 | | 42 | 41 | 94 | B | 30 | 22 | 8.25 | 2.7 | 15 | 45.6 |
| | P6 | | | | | | | | | 22 | 8.25 | 2.7 | 33 | 45.6 |
| 4 | P7 | 60 | 2 | 38 | 40 | 41 | 147 | B | 15 | 22 | 8.25 | 2.7 | 8 | 45.6 |
| | P8 | | | | | | | | | 22 | 8.25 | 2.7 | 17 | 45.6 |
| 5 | P9 | 82 | 18 | — | | 29 | 88 | C | 1000 | 22 | 8.25 | 2.7 | 6 | 45.6 |
| | P10 | | | | | | | | | 22 | 8.25 | 2.7 | 13 | 45.6 |
| 6 | P11 | 93 | 7 | | 47 | 47 | 91 | C | 120 | 22 | 8.25 | 2.7 | 14 | 45.6 |
| | P12 | | | | | | | | | 22 | 8.25 | 2.7 | 21 | 45.6 |
| 7 | P13 | 58 | 1 | 41 | 42 | 43 | 142 | C | 30 | 22 | 8.25 | 2.7 | 6 | 45.6 |
| | P14 | | | | | | | | | 22 | 8.25 | 2.7 | 18 | 45.6 |

| Alloy No. | Forging result | | | | Dezincification corrosion test | Cutting index | Machinability of forged part |
|---|---|---|---|---|---|---|---|
| | Forging temperature ° C. | Moldability | Forging load | weight g | | | |
| 1 | 724 | O | O | 308 | 480 | 43 | Δ |
| | 720 | Δ | O | 310 | | | |
| 2 | 717 | O | A | 310 | 530 | 46 | Δ |
| | 715 | Δ | A | 309 | | | |
| 3 | 720 | O | A | 315 | 340 | 47 | Δ |
| | 713 | X | O | 315 | | | |
| 4 | 718 | O | O | 311 | 150 | 81 | O |
| | 722 | O | O | 307 | | | |
| 5 | 715 | O | A | 312 | 560 | 45 | Δ |
| | 718 | Δ | A | 311 | | | |
| 6 | 720 | O | O | 307 | 280 | 50 | Δ |
| | 714 | Δ | O | 315 | | | |
| 7 | 717 | O | O | 311 | 25 | 80 | O |
| | 728 | O | O | 308 | | | |

*1 The area ratio of the α phase in a specimen produced by heating a hot-forged part at approximately 720° C., holding the part for one minute, and rapidly cooling the part using water
*2 Regarding the type of the forging material, B represents a hot-extruded tube, and C represents a continuous cast tube.
*3 75 × 1/(tube axis direction length/average thickness)$^{1/2}$

TABLE 12

| Alloy No. | Mass production test No. | Area ratios of the respective phases in forged part α phase % | β+γ+μ phase % | κ phase % | Area ratio of α phase immediately before forging % | *1 720° C. α phase % | Hardness after forging HV | *2 Type of forging material B, C | Average crystal grain diameter of forging material μm | Forging material Tube axis direction length mm | Average thickness mm | Tube axis direction length/average thickness | Degree of uneven thickness % | *3 | Forging temperature °C. | Forging result Moldability | Forging load ton | weight g | Dezincification corrosion test | Cutting index | Machinability of forged part |
|---|---|---|---|---|---|---|---|---|---|---|---|---|---|---|---|---|---|---|---|---|---|
| 21 | P15 | 83 | 17 | | — | 33 | 90 | B | 25 | 22 | 8.25 | 2.7 | 11 | 45.6 | 718 | ○ | △ | 308 | 550 | 45 | △ |
| | P16 | | | | | | | | | | | | 16 | 45.6 | 712 | ○ | △ | 315 | | | |
| 22 | P17 | 92 | 8 | | 49 | — | 79 | C | 900 | 22 | 8.25 | 2.7 | 12 | 45.6 | 724 | △ | ○ | 310 | 450 | 46 | △ |
| | P18 | | | | | | | | | | | | 15 | 45.6 | 720 | △ | ○ | 309 | | | |
| 23 | P19 | 93 | 7 | | 46 | — | 86 | B | 40 | 22 | 8.25 | 2.7 | 16 | 45.6 | 722 | ○ | ○ | 309 | 290 | 49 | △ |
| | P20 | | | | | | | | | | | | 34 | 45.6 | 724 | X | ○ | 307 | | | |
| 24 | P21 | 80 | 20 | | — | 23 | 97 | C | 200 | 22 | 8.25 | 2.7 | 6 | 45.6 | 716 | ○ | △ | 312 | 580 | 50 | △ |
| | P22 | | | | | | | | | | | | 13 | 45.6 | 724 | ○ | △ | 306 | | | |
| 25 | P23 | 94 | 6 | | 51 | — | 90 | C | 80 | 22 | 8.25 | 2.7 | 4 | 45.6 | 725 | ○ | ○ | 316 | 240 | 50 | △ |
| | P24 | | | | | | | | | | | | 16 | 45.6 | 720 | ○ | ○ | 308 | | | |
| 26 | P25 | 55 | 2 | 39 | 34 | — | 155 | C | 100 | 22 | 8.25 | 2.7 | 5 | 45.6 | 718 | ○ | ○ | 309 | 50 | 70 | △ |
| | P26 | | | | | | | | | | | | 17 | 45.6 | 726 | ○ | ○ | 311 | | | |
| 27 | P27 | 60 | 2 | 38 | 47 | — | 148 | C | 50 | 22 | 8.25 | 2.7 | 7 | 45.6 | 723 | ○ | ○ | 310 | 35 | 75 | ○ |
| | P28 | | | | | | | | | | | | 15 | 45.6 | 715 | ○ | ○ | 306 | | | |
| 28 | P29 | 64 | 1 | 35 | 41 | — | 144 | C | 800 | 22 | 8.25 | 2.7 | 7 | 45.6 | 714 | ○ | ○ | 308 | 25 | 81 | ○ |
| | P30 | | | | | | | | | | | | 13 | 45.6 | 716 | ○ | ○ | 312 | | | |
| 29 | P31 | 66 | 6 | 28 | 55 | 56 | 139 | C | 30 | 22 | 8.25 | 2.7 | 5 | 45.6 | 726 | ○ | △ | 307 | 20 | 77 | ○ |
| | P32 | | | | | | | | | | | | 14 | 45.6 | 720 | ○ | △ | 312 | | | |
| 30 | P33 | 53 | | 47 | — | 50 | 145 | C | 700 | 22 | 8.25 | 2.7 | 8 | 45.6 | 726 | △ | △ | 306 | 20 | 62 | △ |
| | P34 | | | | | | | | | | | | 13 | 45.6 | 717 | △ | △ | 308 | | | |
| 31 | P35 | 57 | | 43 | 52 | — | 143 | B | 45 | 22 | 8.25 | 2.7 | 5 | 45.6 | 728 | ○ | △ | 307 | 20 | 60 | △ |
| | P36 | | | | | | | | | | | | 10 | 45.6 | 720 | ○ | △ | 310 | | | |
| 32 | P37 | 49 | 4 | 47 | 46 | — | 150 | C | 60 | 22 | 8.25 | 2.7 | 4 | 45.6 | 725 | ○ | ○ | 308 | 30 | 65 | △ |
| | P38 | | | | | | | | | | | | 11 | 45.6 | 720 | ○ | ○ | 310 | | | |
| 33 | P39 | 95 | 5 | | 58 | 57 | 85 | B | 50 | 22 | 8.25 | 2.7 | 3 | 45.6 | 724 | △ | △ | 314 | 240 | 42 | △ |
| | P40 | | | | | | | | | | | | 10 | 45.6 | 723 | △ | △ | 312 | | | |

*1 The area ratio of the α phase in a specimen produced by heating a hot-forged part at approximately 720° C., holding the part for one minute, and rapidly cooling the part using water
*2 Regarding the type of the forging material, B represents a hot-extruded tube, and C represents a continuous cast tube.
*3 75 × 1/(tube axis direction length/average thickness)$^{1/2}$

TABLE 13

| Alloy No. | Mass production test No. | Area ratios of the respective phases in forged part α phase % | Area ratios of the respective phases in forged part β + γ + μ % | Area ratios of the respective phases in forged part κ phase % | Area ratio of α phase immediately before forging % | *1 720° C. α phase % | Hardness after forging HV | *2 Type of forging material B, C | Average crystal grain diameter of forging material μm | Forging material Tube axis direction length mm | Forging material Average thickness mm | Forging material Tube axis direction length/average thickness | Degree of uneven thickness % | *3 |
|---|---|---|---|---|---|---|---|---|---|---|---|---|---|---|
| 101 | P41 | 97 | 3 | | 93 | — | 61 | B | 65 | 22 | 8.25 | 2.7 | 7 | 45.6 |
| 102 | P42 | 69 | 31 | | 1 | — | 106 | B | 25 | 22 | 8.25 | 2.7 | 5 | 45.6 |
| 103 | P43 | 65 | 35 | | 0 | — | 116 | C | 1000 | 22 | 8.25 | 2.7 | 14 | 45.6 |
| 104 | P44 | 98 | 2 | | 95 | — | 65 | B | 70 | 22 | 8.25 | 2.7 | 10 | 45.6 |
| 105 | P45 | 85 | 0 | 15 | 77 | — | 136 | C | 40 | 22 | 8.25 | 2.7 | 4 | 45.6 |
| 106 | P46 | 56 | 34 | 10 | — | 0 | 173 | C | 900 | 22 | 8.25 | 2.7 | 8 | 45.6 |
| 107 | P47 | 91 | 9 | | — | 42 | 78 | B | 30 | 22 | 8.25 | 2.7 | 13 | 45.6 |
| 108 | P48 | 93 | 7 | | — | 47 | 85 | C | 150 | 22 | 8.25 | 2.7 | 11 | 45.6 |
| 109 | P49 | 72 | 26 | | — | 7 | 93 | B | 25 | 22 | 8.25 | 2.7 | 12 | 45.6 |
| 110 | P50 | 92 | 6 | | 72 | — | 66 | B | 30 | 22 | 8.25 | 2.7 | 13 | 45.6 |
| 111 | P51 | 85 | 14 | | 31 | — | 94 | B | 25 | 22 | 8.25 | 2.7 | 16 | 45.6 |
| 112 | P52 | 65 | 1 | 34 | 41 | — | 142 | C | 800 | 22 | 8.25 | 2.7 | 8 | 45.6 |
| 113 | P53 | 97 | 3 | | 63 | 64 | 79 | C | 1200 | 22 | 8.25 | 2.7 | 8 | 45.6 |
| 114 | P54 | 79 | 2 | 19 | 57 | 58 | 130 | C | 900 | 22 | 8.25 | 2.7 | 5 | 45.6 |

| Alloy No. | Forging temperature ° C. | Moldability | Forging load ton | Forging weight g | Dezincification corrosion test | Cutting index | Machinability of forged part |
|---|---|---|---|---|---|---|---|
| 101 | 722 | X | X | 307 | 350 | 37 | X |
| 102 | 715 | X | A | 308 | 950 | 50 | Δ |
| 103 | 717 | X | A | 310 | 1050 | 55 | Δ |
| 104 | 723 | X | X | 313 | 160 | 38 | X |
| 105 | 723 | X | X | 310 | 40 | 65 | Δ |
| 106 | 718 | X | A | 309 | 450 | 68 | Δ |
| 107 | 718 | ○ | ○ | 314 | 500 | 38 | X |
| 108 | 715 | ○ | ○ | 316 | 420 | 37 | X |
| 109 | 718 | ○ | ○ | 314 | 900 | 89 | ○ |
| 110 | 718 | X | X | 314 | 230 | 87 | ○ |
| 111 | 719 | ○ | ○ | 311 | 540 | 51 | Δ |
| 112 | 716 | ○ | ○ | 309 | 30 | 82 | ○ |
| 113 | 723 | Δ | X | 313 | 220 | 38 | X |
| 114 | 722 | X | Δ | 307 | 120 | 69 | Δ |

*1 The area ratio of the α phase in a specimen produced by heating a hot-forged part at approximately 720° C., holding the part for one minute, and rapidly cooling the part using water
*2 Regarding the type of the forging material, B represents a hot-extruded tube, and C represents a continuous cast tube.
*3 75 × 1/(tube axis direction length/average thickness)$^{1/2}$ First, the moldability and the characteristics after forging will be described.

When Alloy Nos. 1, 5, 21, 22, 101, 102 and 107 which do not contain Si are taken into account, even when the amount of Pb changes to become close to the upper and lower limits of the composition range of the invention alloy (Alloy Nos. 21 and 22), there is no influence on the moldability during forging, and the machinability slightly improves or degrades. When the amount of Cu becomes lower than the lower limit of the composition range of the invention alloy (Alloy No. 102), the area ratio of the α phase during forging becomes approximately 0%, and large wrinkles or cracks are generated such that the moldability degrades, but forging is possible with a low load in terms of the forging load. In addition, the corrosion resistance also significantly deteriorates. When the composition coefficient exceeds 64 which is the upper limit of the range of the invention alloy (Alloy No. 101), the area ratio of the α phase during forging exceeds 80%, and the alloy is not molded into predetermined dimensions even when the forging load is increased.

Since the amount of the β phase increases as the amount of Cu decreases or the composition coefficient decreases, the hardness after forging has a tendency to increase as the amount of Cu decreases or the composition coefficient decreases. In contrast, when the composition coefficient exceeds 64, the hardness decreases. Collectively, the structural differences caused by the extruded tube and the continuous cast tube also serves as a cause for the difference of hardness (Alloy Nos. 5 and 21). The corrosion resistance is mainly dependent on the area ratio of the β phase of the forged part, and Alloy No. 102 exceeds 600 μm in terms of ISO 6509.

When Alloy Nos. 3, 6, 21 and 23 which correspond to the fourth invention alloy that contains no Si and Comparative Alloy 104 are taken into account, even when the contents of the additional elements change within the composition range of the fourth invention alloy (Alloy Nos. 3, 6, 21 and 23), there is no influence on moldability. In addition, the influence on hardness is also small. In contrast, the generation of the γ phase due to the addition of Sn increases the hardness index, which leads to the improvement of corrosion resistance, machinability and wear resistance.

However, when the composition coefficient is outside a range of 59 to 64 (Alloy No. 104), the moldability is significantly impaired, and the hardness is low.

When Alloy Nos. 2, 24 and 33 which correspond to the second and fourth invention alloys that contain a small amount of Si and Comparative Alloy Nos. 103, 108, 111 and 113 are taken into account, the forging load or the moldability is favorable, and the hardness index is high (Alloy Nos. 2 and 24). Even when the concentration of Cu exceeds 60 mass %, the moldability is poor as long as the composition coefficient is not satisfied (Alloy No. 103). When the amount of Pb is slightly below the composition range of the invention alloy, the machinability deteriorates (Alloy Nos. 2 and 108). In Alloy No. 33, the composition coefficient and the proportion of the α phase during forging are close to the upper limit of the range of the application, but any of the forging load, the moldability, and cutting cannot be practically carried out. Meanwhile, in Comparative Alloy No. 113, the composition coefficient is within the range of the application, and the proportion of the α phase during forging slightly exceeds 60%, and therefore the forging load and cutting are both difficult to be practically carried out. Based on what has been described above, it was found that a composition coefficient of 64 and a proportion of α phase during forging of 60% are critical values for the forging load, the moldability, and cutting.

When Alloy Nos. 4, 7, 26 to 32, 105, 106, 112 and 114 which correspond to the third and fourth invention alloys which contain 73 mass % or more of Cu and have a high concentration of Si are taken into account, even when Si is changed within the composition range of the invention alloy (Alloy Nos. 26 to 32), there is no problem with moldability, and high strength, favorable corrosion resistance, and favorable machinability are maintained. However, when the composition coefficient is outside a range of 59 to 64 (Alloy Nos. 105 and 106), since the area ratio of the α phase during forging is beyond a range in which favorable moldability can be obtained, the moldability is impaired. In addition, the machinability is also degraded. However, when the composition coefficient decreases due to the amount of Si, the forging load decreases. Even when the composition coefficient is close to 64, the area ratio of the α phase during forging is slightly below 60%, and, consequently, there is no problem with the forging load, but the moldability deteriorates. Based on what has been described above, it was found that a composition coefficient of 64 and a proportion of α phase during forging of 60% are critical values for the forging load, the moldability, and cutting (Alloy Nos. 29, 105 and 114). When the concentration of Si is close to 4 mass % (Alloy Nos. 30 to 32), the proportion of the κ phase increases, the hardness index is high, and the corrosion resistance is favorable, but the forging load becomes slightly increased.

As described above, while the hot-extruded tubes or the continuous cast tubes were sampled from an actual manufacturing process, and materials having a variety of degrees of uneven thickness were forged, in materials having a degree of uneven thickness of 30% or less, no adverse influence on the moldability or the forging load is observed. However, in materials having a degree of uneven thickness of more than 30% in the hot-extruded tubes, it is observed that the moldability degrades, and the forging load increases.

Next, the cutting status of the hot-forged parts manufactured using the above-described actual production facility will be described.

After the forging process, finishing cutting was carried out on the side of the forged part having an inner diameter of φ70 to an inner diameter of φ72, and finishing cutting was carried out on the side of the forged part having an inner diameter of φ56 to an inner diameter of φ58. The process was carried out under the cutting conditions of K10 equivalent chips, 2000 rpm and 0.20 mm/rev. A cutting process was carried out even on the comparative alloys which had poor moldability such as underfill with a determination that there was no influence on the cutting workability.

The cutting status of the inner diameter finishing cutting was evaluated as three levels as follows. When chips were segmented, the cutting resistance was low, no defects were observed on the product surface, and the forging material was cut with no problem, the cutting was evaluated to be "O"; when chips were continuous, the cutting resistance was slightly increased, there was some concern that the service life of the tool might be decreased during mass cutting, but mass cutting was possible, and there was no problem with product properties, the cutting was evaluated to be "Δ"; and when chips were thick and not segmented, the product surface was scratched, chips were entangled with tools, wrinkled defects were generated on the product surface, a favorable surface state could not be obtained, or tools were worn during cutting, the cutting was evaluated to be "X".

Since Alloy Nos. 1 and 5 of the first invention alloy had a low amount of Pb, a low area ratio of the β phase which is advantageous for cutting, and contained no elements that were effective for cutting, such as Bi, chips which continued in a flowing form were generated, and the cutting resistance was also high, but it was determined that mass production was possible, whereby the alloys were evaluated to be Δ.

Alloy No. 21 had a composition in which the amount of Pb was further decreased than in Alloy No. 1 to 0.006 mass %, but there was no change in the tendency of the machinability due to the effect of the inclusion of Sn, and the alloy was evaluated to be Δ. Alloy No. 22 had the same amount of Pb and the same area ratio of the β phase+the γ phase+the μ phase as Alloy No. 1, chips were continuously generated, and there was a tendency of the cutting resistance increasing, the alloy was determined to be cut, and thus evaluated to be Δ. The evaluation concerns the cutting of forged parts that had been forged into the near net shape, and, since the product was given an extremely decreased cutting tolerance, the alloy could be cut. It can be easily considered that, when the forged products were produced from rods for which spacious cutting allowances needed to be supplied as illustrated in FIGS. 4A and 4B, problems such as a chip treatment or tool wear were caused during rough cutting, and the alloys could not be cut.

Furthermore, in Alloy Nos. 107 and 108 in which the amount of Pb was decreased to an order of 0.001 mass % and Alloy Nos. 101 and 104 in which the area ratio of the α phase in the metal structure of the forged part containing a small amount of Pb exceeded 95% and the proportion of the β phase+the γ phase+the μ phase was less than 5%, chips were not segmented, were entangled with tools, and damaged the surface of the product, whereby the forged parts were evaluated to be X.

In Alloy Nos. 2 and 24 which correspond to the second invention alloy and the fourth invention alloy which was based on the second invention alloy and Alloy No. 103 which was produced for comparison with Alloy Nos. 2 and 24, there was a tendency of chips to be slightly and continuously generated, but no problem was caused during cutting, and cutting was possible. It is found that the γ phase or the β phase which was formed by the addition of Si, Sn, Al and the like contributes to cutting. However, the machinability did not significantly improve, and the forged parts were evaluated to be A.

Among Alloy Nos. 4, 7, 26, 27, 28, 29, 105 and 106 which correspond to the third invention alloy and the fourth invention alloy which was based on the third invention alloy, in Alloy Nos. 4, 7, 27, 28 and 29, since a large amount of the κ phase and the γ phase which were formed by adding Si were present, there was no problem with cutting. Meanwhile, due to the elements that contributed to an increase in the strength such as Mn and Ni in Alloy No. 26, and the non-optimal addition amount of Si and the small proportion of the κ phase in Alloy Nos. 105 and 106, there was a problem to some extent with cutting in an actual production facility, and the cutting resistance increased. Therefore, Alloy Nos. 4, 7, 27, 28 and 29 were evaluated to be O, and Alloy Nos. 26, 105 and 106 were evaluated to be Δ. Alloy No. 7 had the same components as Alloy No. 4, also had the same mechanical characteristics as Alloy No. 4 due to the miniaturization of crystal grains while manufactured through continuous casting, there was no problem with cutting, and the alloy was evaluated to be O.

Regarding Alloys (Nos. 30, 31 and 32) which had a high concentration of Cu and a high concentration of Si, the α phase ratio slightly increased during forging, and there are cases in which the alloys are evaluated to be Δ in terms of moldability and the forging load during hot forging, the hardness is high, and the corrosion resistance is excellent.

The cutting test results in the laboratory almost coincide with the results in an actual production facility, which showed that, in a case in which the machinability index of a free-cutting brass rod C3604 which contained 3% of Pb was set to 100, for alloys having a machinability index of approximately more than 70, forged parts obtained in the invention could be molded into the near net shape, and the cutting amount was small, and therefore cutting was possible in an actual production facility with no problem. In addition, when the machinability index exceeded 40, in an actual production facility, there was a problem with the machinability to some extent, but acceptable cutting was possible, and, in a case in which the machinability index was 40 or less, cutting in an actual production facility was not possible. When the conditions of the composition coefficient and the metal structure are satisfied, and 0.003% or more of Pb is contained, the machinability index can reach more than 40, and the problem of the application can be solved.

Comparative Alloy Nos. 111 and 112 are specimens that contained a large amount of Pb. Alloy Nos. 2 and 28 had a similar composition. When both comparative alloys and invention alloys are compared, there is no large difference in terms of forging results (moldability and forging load), hardness, corrosion resistance and the machinability. The results of the cutting test in the laboratory shows that, due to the inclusion of 0.38 mass % and 0.36 mass % of Pb, the machinability improves with an increase in the machinability index by 5 points and 2 points, which does not show a difference from the results of the cutting test of forged parts in an actual machine. That is, since the invention is forged into the near net shape, the cut amount is small, and, particularly, the invention can be cut even when not having an excellent machinability. The invention alloy and the comparative alloys have a difference in the content of Pb as large as approximately ten times (several times to 100 times), and the amount of Pb being eluted into potable water from a potable water device produced using forged parts is dependent on the content of Pb in the tools. When the degree of influence on human bodies is taken into account, the content of Pb is preferably lower as long as the workability and the characteristics are almost the same.

The following can be said based on hot-forged parts manufactured in an actual production facility.

(1) The forging load is dependent on the composition coefficient and the area ratio of the α phase during forging. When the composition coefficient is less than 61, alloys can be molded with a low power, and, even when the composition coefficient is in a range of 61 to 63, a high power is not required. When the composition coefficient exceeds 63.5, a slightly high power is required, and, when the composition coefficient exceeds 64, a high power is required. When the area ratio of the α phase is 35% or less during hot forging, alloys can be molded with a low power, and, even when the area ratio is in a range of 35% to 50%, a high power is not required. When the area ratio exceeds 55%, a slightly high power is required, and, when the area ratio exceeds 60%, a high power is required.

(2) Within the range of the hot-forged copper alloy part according to the invention, it is possible to mold alloys into the near net shape as long as the degree of uneven thickness of a forging material does not exceed 30%. In order to obtain a forged part having more favorable moldability, that is, a forged part having a dimensional tolerance within 1%, the degree of uneven thickness needs to be within 15% or 20%. When the forging material is a continuous-cast rod, and crystal grains are large, it is not possible to obtain moldability with a strict tolerance as long as the degree of uneven thickness is not within 10%. Regarding continuous cast tubes including small crystal grains, forged parts having the same tolerance as hot-extruded tubes can be obtained. When the composition coefficient exceeded 64, or the area ratio of the α phase exceeded 60% during forging, all alloys could not be fully molded through 150-ton pressing. On the other hand, when the composition coefficient was less than 59, or the area ratio of the α phase was less than 3% during forging, alloys could be molded with a small forging load, but wrinkles, cracks and the like were generated in forged parts, and the moldability was poor in all alloys.

(3) The corrosion resistance is opposite to the results of the above-described (1) except for alloys containing a large amount, 2.5 mass % or more, of Si. In order to obtain a required minimum level of corrosion resistance, that is, to obtain a maximum corrosion depth of 600 μm or less in the test of ISO6509, the composition coefficient needs to be at least 59, the area ratio of the α phase during forging needs to be at least 3%, or the proportion of the β phase+the γ phase+the μ phase needs to be 25% or less in the metal structure after forging. In order to obtain a favorable level of corrosion resistance, that is, to obtain a maximum corrosion depth of 400 μm or less in the test of ISO6509, it is preferable that the composition coefficient be 60 or more or 61 or more, the area ratio of the α phase during forging be 35% or more, or the proportion of the β phase+the γ phase+the μ phase be 10% or less in the metal structure after forging. The effects of the elements that improve the corrosion resistance such as Sn, As and P become small when the composition coefficient fails to be 59 or more, and preferably 61 or more, the area ratio of the α phase during forging fails to be at least 3%, and preferably 35% or more, or the proportion of the β phase+the γ phase+the μ phase fails to be 25% or less, and preferably 10% or less in the metal structure after forging. In alloys which contain 2.5 mass % or more of Si, the moldability is dependent on the area ratio of the β phase+the γ phase+the μ phase in the metal structure after forging, and, when the area ratio of the β phase+the γ phase+the μ phase is 10% or less, and particularly 8% or less, or the area ratio of the α phase+the κ phase is 85% or more, and preferably 90% or more, superior corrosion resistance is exhibited. This is because the κ phase has similar or superior corrosion resistance to the α phase.

(4) The strength of materials is dependent on the composition coefficient, the area ratio of the β phase+the γ phase+the μ phase after forging, the area ratio of the κ phase after forging and the area ratio of the α phase, and is influenced by the elements that strengthen the materials such as Sn and Al. When the composition coefficient exceeds 64, the area ratio of the β phase+the γ phase+the μ phase after forging and the area ratio of the κ phase after forging are small, or the area ratio of the α phase exceeds, for example, 95%, the Vickers hardness, that is, the strength decreases, and there is a concern that, when the thickness of the material is decreased, a problem may be caused with the strength. In other words, there is a tendency that, as the composition coefficient decreases below 64, the area ratio of the β phase+the γ phase+the μ phase after forging and the area ratio of the κ phase after forging increase, or the area ratio of the α phase decreases, the strength increases, and the Vickers hardness preferably exceeds 70, and more preferably exceeds 85 or 95. The invention alloy containing 2.5 mass % or more of Si has a low area ratio of the α phase, and, when the area ratio of the β phase+the γ phase+the μ phase is added to the area ratio of the κ phase, the area ratio of the κ phase+the β phase+the γ phase+the μ phase increases, and therefore the strength increases.

(5) Since the forged parts obtained by forging a solid rod could not be cut into the near net shape, the cut amount (equivalent to cut depth) of rough cutting (before the finishing cutting process) increased, and, in Alloy Nos. 1 and 6, there was a problem of entanglement with tools. Since the cut amount was small, the finishing cutting process was acceptable in mass production. It was confirmed that, when the cut amount was small, alloys were available in mass cutting although the alloys contained 0.2 mass % or less of Pb, furthermore, 0.1 mass % or less of Pb.

(6) Regarding the relationship between the cutting test in the laboratory and the finishing cutting process in mass production, the cutting in mass production was classified into applicable and non-applicable at a border of the machinability index obtained in the laboratory of approximately 40, and was classified into applicable and excellent at a machinability index obtained in the laboratory of 70 or 75.

(7) There is a tendency that the cutting workability deteriorates as the content of Pb decreases, the composition coefficient increases above 64, the area ratio of the κ phase+the β phase+the γ phase+the μ phase decreases, the area ratio of the α phase increases, and the contents of Sn, Si and the like decrease. When the amount of Pb is less than 0.003 mass % (Alloy Nos. 107 and 108), or when the amount of Pb is within the composition range of the invention alloy, but the composition coefficient is larger than 64 (Alloy Nos. 101 and 104), the finishing cutting process deteriorates. Regarding the additional elements, the additional elements that improve the machinability such as Sn, Si and Al are more distributed in the β phase and the γ phase than in the α phase in the matrix, that is, the concentration of the additional elements becomes higher in the β phase, the γ phase, the μ phase and the κ phase than in the α phase, and the β phase, the γ phase, the μ phase and the κ phase having a high concentration of the additional elements have a more favorable cutting-improving function than the β phase and the γ phase being formed in Cu—Zn alloys. Therefore, as the concentration of the additional elements having a function of improving the machinability as well as the amount of the β phase, the γ phase and the κ phase increase, the machinability improves. In alloys containing 2.5 mass % or more of Si, since the κ phase in addition to the β phase and the γ phase increases, the alloys have excellent cutting workability. However, since the machinability-improving effect is saturated at an amount of the β phase, the γ phase and the like of approximately 20%, in Alloy Nos. 102 and 103 as well in which a large amount, 31% and 35% of the β phase and the like are included, the machinability index remains at 50 and 55.

(8) A copper alloy containing approximately 2 mass % of Pb (Alloy No. 109, C3771) was used for potable water devices produced through forging, and, since the tubular forged part of the invention can be molded into the near net shape, the cut amount is small, and industrial cutting becomes possible even when the content of Pb is set to 0.3 mass % or less, which is approximately 1/10 of that of conventional alloys, and, furthermore, to 0.1 mass % or less. Since the elution of Pb from potable water device, which is dependent on the content of Pb, significantly improves, and the forged part takes little costs and has excellent corrosion resistance and other characteristics, the forged part can be preferably used not only in containers or devices such as water supply, drainage and hot-water supply facilities, but also in air-conditioning facilities, gas facilities, a variety of industrial machinery and facilities, and mechanical components or electric components of automobiles.

As a result of the tests, the followings can be said.

(1) A forged part which is the tubular hot-forged copper alloy part of the first invention alloy and in which the shape of the forged part satisfies a formula of 0.4≤(average inner diameter)/(average outer diameter)≤0.92, 0.04≤(average thickness)/(average outer diameter)≤0.3, and 1≤(tube axis direction length)/(average thickness))≤10, and a forging material which is to be hot-forged has a tubular shape and satisfies 0.3≤(average inner diameter/average outer diameter)≤0.88, 0.06≤(average thickness)/(average outer diameter)≤0.35, and 0.8≤(tube axis direction length)/(average thickness))≤12, and 0%≤(degree of uneven thickness)≤30%, 0≤(degree of uneven thickness)≤75×1/((tube axis direction length)/(average thickness))$^{1/2}$ in any location in a tube axis direction has low deformation resistance of hot forging, is excellent in terms of deformability, moldability and corrosion resistance, and has high strength and a favorable machinability (refer to Mass production test Nos. P1, P9 and the like).

(2) A forged part which is the tubular hot-forged copper alloy part of the second invention alloy and in which the shape of the forged part satisfies a formula of 0.4≤(average inner diameter)/(average outer diameter)≤0.92, 0.04≤(average thickness)/(average outer diameter)≤0.3, and 1≤(tube axis direction length)/(average thickness))≤10, and a forging material which is to be hot-forged has a tubular shape and satisfies 0.3≤(average inner diameter/average outer diameter)≤ 0.88, 0.06≤(average thickness)/(average outer diameter)≤ 0.35, and 0.8≤(tube axis direction length)/(average thickness))≤12, and 0%≤(degree of uneven thickness)≤30%, 0≤(degree of uneven thickness)≤75×1/((tube axis direction length)/(average thickness))$^{1/2}$ in any location in a tube axis direction contains Si, and therefore, furthermore, the forged part is excellent in terms of corrosion resistance, strength, moldability and the machinability (refer to Mass production test Nos. P3 and the like).

(3) A forged part which is the tubular hot-forged copper alloy part of the third invention alloy and in which the shape of the forged part satisfies a formula of 0.4≤(average inner diameter)/(average outer diameter)≤0.92, 0.04≤(average thickness)/(average outer diameter)≤0.3, and 1≤(tube axis direction length)/(average thickness))≤10, and a forging material which is to be hot-forged has a tubular shape and satisfies 0.3≤(average inner diameter/average outer diameter)≤ 0.88, 0.06≤(average thickness)/(average outer diameter)≤ 0.35, and 0.8≤(tube axis direction length)/(average thickness))≤12, and 0%≤(degree of uneven thickness)≤30%, 0≤(degree of uneven thickness)≤75×1/((tube axis direction length)/(average thickness))$^{1/2}$ in any location in a tube axis direction contains a large amount of Cu and Si, and therefore, furthermore, the forged part is excellent in terms of corrosion resistance, strength and the machinability (refer to Mass production test Nos. P7 and the like).

(4) A forged part which is the tubular hot-forged copper alloy part of the fourth invention alloy and in which the shape of the forged part satisfies a formula of 0.4≤(average inner diameter)/(average outer diameter)≤0.92, 0.04≤(average thickness)/(average outer diameter)≤0.3, and 1≤(tube axis direction length)/(average thickness))≤10, and a forging material which is to be hot-forged has a tubular shape and satisfies 0.3≤(average inner diameter/average outer diameter)≤ 0.88, 0.06≤(average thickness)/(average outer diameter)≤ 0.35, and 0.8≤(tube axis direction length)/(average thickness))≤12, and 0%≤(degree of uneven thickness)≤30%, 0≤(degree of uneven thickness)≤75×1/((tube axis direction length)/(average thickness))$^{1/2}$ in any location in a tube axis direction contains As and the like, and therefore, furthermore, the forged part is excellent in terms of corrosion resistance, strength and the machinability (refer to Mass production test Nos. P5, P11 and the like).

(5) In the forged parts of the above (1) to (4), the area ratio of the α phase is in a range of 30% to less than 100%, and the sum of the area ratio of the β phase, the area ratio of the γ phase and the area ratio of the μ phase is in a range of 0% to 25% in the metal structure at room temperature after hot forging (refer to Mass production test Nos. P1, P3, P5, P7, P9, P11 and the like).

(6) The forged parts of the above (1) to (4) are manufactured by heating the forging material at the hot forging temperature, and hot-forging the forging material, the hot forging temperature is in a range of 650° C. to 800° C., and the area ratio of the α phase in the metal structure of the forging material at the hot forging temperature is in a range of 3% to 60% (refer to Mass production test Nos. P1, P3, P5, P7, P11 and the like).

(7) When the forged parts of the above (1) to (4) are heated at 720° C., the area ratio of the α phase in the metal structure is in a range of 3% to 60% (refer to Mass production test Nos. P5, P7, P9, P11 and the like)

(8) In the respective forged parts, the area ratio of the α phase in the specimens produced by heating the forging material at a predetermined temperature to prepare for hot forging, holding the forging material for one minute, and rapidly cooling the forging material using water without forging, and the area ratio of the α phase in the specimens produced by heating the hot-forged part at approximately 720° C., holding the hot-forged part for one minute, and rapidly cooling the hot-forged part using water are almost the same (refer to Mass production test Nos. P5, P7, P11, P13 and the like).

INDUSTRIAL APPLICABILITY

The hot-forged copper alloy parts of the invention can be preferably used for, for example, a variety of industrial machinery and facilities, mechanical parts for automobiles, electric components, and members such as valves, ball valves, joints, joints and connection tools for crosslinked polyethylene tubes, joints and connection tools for crosslinked polybutene tubes, connection tools for water supply and drainage, hose nipples, connection tools for gardening hoses, connection tools for gas hoses, lids for water meters, water faucets, hydraulic containers, nozzles, sprinklers, flare nuts, nuts, water supply and hot-water supply facilities, air-conditioning facilities, containers, connection tools and devices for fire protection facilities and gas facilities, containers and devices through which water, warm water, refrigerants, air, town gas and propane gas pass, and the like.

The invention claimed is:

1. A hot-forged copper alloy part which has a tubular shape, wherein an alloy composition contains 59.0 mass % to 84.0 mass % of Cu and 0.003 mass % to 0.3 mass % of Pb with a remainder of Zn and inevitable impurities, a content of Cu [Cu] mass % and a content of Pb [Pb] mass % have a relationship of 59≤[Cu]+0.5×[Pb])≤64, a shape of the forged part satisfies a formula of 0.4≤(average inner diameter)/(average outer diameter)≤0.92, 0.04≤(average thickness)/(average outer diameter)≤0.3, and 1≤(tube axis direction length)/(average thickness)≤10, and a forging material which is to be hot-forged has a tubular shape and satisfies 0.3≤(average inner diameter/average outer diameter)≤0.88, 0.06≤(average thickness)/(average outer diameter)≤0.35, and 0.8≤(tube axis direction length)/(average thickness)≤12, and 0%≤(degree of uneven thickness)≤30%, 0≤(degree of uneven thickness)≤75×1/((tube axis direction length)/(average thickness))$^{1/2}$ in any location in a tube axis direction.

2. The hot-forged copper alloy part according to claim 1, wherein the hot-forged copper alloy part further contains at least one of 0.01 mass % to 0.3 mass % of As, 0.01 mass % to 0.3 mass % of Sb, 0.01 mass % to 0.3 mass % of P, 0.01 mass % to 0.3 mass % of Mg, 0.01 mass % to 1.5 mass % of Sn, 0.01 mass % to 1.0 mass % of Al, 0.01 mass % to 4.0 mass % of Mn, 0.01 mass % to 4.0 mass % of Ni, 0.0005 mass % to 0.05 mass % of Zr, 0.0005 mass % to 0.05 mass % of B and 0.003 mass % to 0.3 mass % of Bi, and a content of Cu [Cu] mass %, a content of Pb [Pb] mass %, a content of Si [Si] mass %, a content of Ni [Ni] mass %, a content of Mn [Mn] mass %, a content of As [As] mass %, a content of Zr [Zr] mass %, a content of B [B] mass %, a content of Bi [Bi] mass %, a content of Sb [Sb] mass %, a content of Sn [Sn] mass %, a content of Mg [Mg] mass %, a content of Al [Al] mass % and a content of P [P] mass % have a relationship of 59≤([Cu]+0.5×[Pb]−4.5×[Si]+2.2×[Ni]+1.4×[Mn]+0.5×([As]+[Zr]+[B]+[Bi])−1.2×([Sb]+[Sn]+[Mg])−2.2×[Al]−3×[P])≤64.

3. The hot-forged copper alloy part according to claim 1, wherein, in a metal structure at room temperature after the hot forging, an area ratio of α phase is in a range of 30% to 100%, and a sum of an area ratio of β phase, an area ratio of γ phase and an area ratio of μ phase is in a range of 0% to 25%.

4. The hot-forged copper alloy part according to claim 1, wherein the tubular hot-forged copper alloy part is manufactured by heating the forging material to a hot forging temperature so as to be hot-forged, and the hot forging temperature is in a range of 650° C. to 800° C., and the area ratio of the α phase in the metal structure of the forging material at the hot forging temperature is in a range of 3% to 60%.

5. The hot-forged copper alloy part according to claim 1, wherein, when the forging material is heated at 720° C., the area ratio of the α phase in the metal structure is in a range of 3% to 60%.

6. The hot-forged copper alloy part according to claim 1, wherein the forging material is a continuous cast tube.

7. The hot-forged copper alloy part according to claim 1, wherein the hot-forged copper alloy part is used for valves, ball valves, joints, joints and connection tools for crosslinked polyethylene tubes, tube joints and connection tools for crosslinked polybutene tubes, connection tools for water supply and drainage, hose nipples, connection tools for gardening hoses, connection tools for gas hoses, lids for water meters, water faucets, hydraulic containers, nozzles, sprinklers, flare nuts, nuts, water supply and hot-water supply facilities, air-conditioning facilities, containers, connection tools and devices for fire protection facilities and gas facilities, containers and devices through which water, warm water, coolants, air, city gas and propane gas pass.

8. The hot-forged copper alloy part according to claim 2, wherein, in a metal structure at room temperature after the hot forging, an area ratio of α phase is in a range of 30% to 100%, and a sum of an area ratio of β phase, an area ratio of γ phase and an area ratio of μ phase is in a range of 0% to 25%.

9. The hot-forged copper alloy part according to claim 2, wherein the tubular hot-forged copper alloy part is manufactured by heating the forging material to a hot forging temperature so as to be hot-forged, and
the hot forging temperature is in a range of 650° C. to 800° C., and the area ratio of the α phase in the metal structure of the forging material at the hot forging temperature is in a range of 3% to 60%.

10. The hot-forged copper alloy part according to claim 2, wherein, when the forging material is heated at 720° C., the area ratio of the α phase in the metal structure is in a range of 3% to 60%.

11. The hot-forged copper alloy part according to claim 2, wherein the forging material is a continuous cast tube.

12. The hot-forged copper alloy part according to claim 2, wherein the hot-forged copper alloy part is used for valves, ball valves, joints, joints and connection tools for crosslinked polyethylene tubes, tube joints and connection tools for crosslinked polybutene tubes, connection tools for water supply and drainage, hose nipples, connection tools for gardening hoses, connection tools for gas hoses, lids for water meters, water faucets, hydraulic containers, nozzles, sprinklers, flare nuts, nuts, water supply and hot-water supply facilities, air-conditioning facilities, containers, connection tools and devices for fire protection facilities and gas facilities, containers and devices through which water, warm water, coolants, air, city gas and propane gas pass.

13. A hot-forged copper alloy part which has a tubular shape,
wherein an alloy composition contains 59.0 mass % to 84.0 mass % of Cu, 0.003 mass % to 0.3 mass % of Pb and 0.05 mass % to 4.5 mass % of Si with a remainder of Zn and inevitable impurities, a content of Cu [Cu] mass %, a content of Pb [Pb] mass % and a content of Si [Si] mass % have a relationship of $59 \leq ([Cu]+0.5\times[Pb]-4.5\times[Si]) \leq 64$, a shape of the forged part satisfies a formula of $0.4 \leq$ (average inner diameter)/(average outer diameter) $\leq 0.92$, $0.04 \leq$ (average thickness)/(average outer diameter) $\leq 0.3$, and $1 \leq$ (tube axis direction length)/(average thickness) $\leq 10$, and
a forging material which is to be hot-forged has a tubular shape and satisfies $0.3 \leq$ (average inner diameter/average outer diameter) $\leq 0.88$, $0.06 \leq$ (average thickness)/(average outer diameter) $\leq 0.35$, and $0.8 \leq$ (tube axis direction length)/(average thickness) $\leq 12$, and $0\% \leq$ (degree of uneven thickness) $\leq 30\%$, $0 \leq$ (degree of uneven thickness) $\leq 75 \times 1/((\text{tube axis direction length})/(\text{average thickness}))^{1/2}$ in any location in a tube axis direction.

14. The hot-forged copper alloy part according to claim 13, wherein the hot-forged copper alloy part further contains at least one of 0.01 mass % to 0.3 mass % of As, 0.01 mass % to 0.3 mass % of Sb, 0.01 mass % to 0.3 mass % of P, 0.01 mass % to 0.3 mass % of Mg, 0.01 mass % to 1.5 mass % of Sn, 0.01 mass % to 1.0 mass % of Al, 0.01 mass % to 4.0 mass % of Mn, 0.01 mass % to 4.0 mass % of Ni, 0.0005 mass % to 0.05 mass % of Zr, 0.0005 mass % to 0.05 mass % of B and 0.003 mass % to 0.3 mass % of Bi, and
a content of Cu [Cu] mass %, a content of Pb [Pb] mass %, a content of Si [Si] mass %, a content of Ni [Ni] mass %, a content of Mn [Mn] mass %, a content of As [As] mass %, a content of Zr [Zr] mass %, a content of B [B] mass %, a content of Bi [Bi] mass %, a content of Sb [Sb] mass %, a content of Sn [Sn] mass %, a content of Mg [Mg] mass %, a content of Al [Al] mass % and a content of P [P] mass % have a relationship of $59 \leq ([Cu]+0.5\times[Pb]-4.5\times[Si]+2.2\times[Ni]+1.4\times[Mn]+0.5\times([As]+[Zr]+[B]+[Bi])-1.2\times([Sb]+[Sn]+[Mg])-2.2\times[Al]-3\times[P]) \leq 64$.

15. The hot-forged copper alloy part according to claim 13, wherein, in a metal structure at room temperature after the hot forging, an area ratio of α phase is in a range of 30% to 100%, and a sum of an area ratio of β phase, an area ratio of γ phase and an area ratio of μ phase is in a range of 0% to 25%.

16. The hot-forged copper alloy part according to claim 13, wherein the tubular hot-forged copper alloy part is manufactured by heating the forging material to a hot forging temperature so as to be hot-forged, and
the hot forging temperature is in a range of 650° C. to 800° C., and the area ratio of the α phase in the metal structure of the forging material at the hot forging temperature is in a range of 3% to 60%.

17. The hot-forged copper alloy part according to claim 13, wherein, when the forging material is heated at 720° C., the area ratio of the α phase in the metal structure is in a range of 3% to 60%.

18. The hot-forged copper alloy part according to claim 13, wherein the forging material is a continuous cast tube.

19. The hot-forged copper alloy part according to claim 13, wherein the hot-forged copper alloy part is used for valves, ball valves, joints, joints and connection tools for crosslinked polyethylene tubes, tube joints and connection tools for crosslinked polybutene tubes, connection tools for water supply and drainage, hose nipples, connection tools for gardening hoses, connection tools for gas hoses, lids for water meters, water faucets, hydraulic containers, nozzles, sprinklers, flare nuts, nuts, water supply and hot-water supply facilities, air-conditioning facilities, containers, connection tools and devices for fire protection facilities and gas facilities, containers and devices through which water, warm water, coolants, air, city gas and propane gas pass.

20. The hot-forged copper alloy part according to claim 14, wherein, in a metal structure at room temperature after the hot forging, an area ratio of α phase is in a range of 30% to 100%, and a sum of an area ratio of β phase, an area ratio of γ phase and an area ratio of μ phase is in a range of 0% to 25%.

21. The hot-forged copper alloy part according to claim 14, wherein the tubular hot-forged copper alloy part is manufactured by heating the forging material to a hot forging temperature so as to be hot-forged, and
the hot forging temperature is in a range of 650° C. to 800° C., and the area ratio of the α phase in the metal structure of the forging material at the hot forging temperature is in a range of 3% to 60%.

22. The hot-forged copper alloy part according to claim 14, wherein, when the forging material is heated at 720° C., the area ratio of the α phase in the metal structure is in a range of 3% to 60%.

23. The hot-forged copper alloy part according to claim 14, wherein the forging material is a continuous cast tube.

24. The hot-forged copper alloy part according to claim 14, wherein the hot-forged copper alloy part is used for valves, ball valves, joints, joints and connection tools for crosslinked polyethylene tubes, tube joints and connection tools for crosslinked polybutene tubes, connection tools for water supply and drainage, hose nipples, connection tools for gardening hoses, connection tools for gas hoses, lids for water meters, water faucets, hydraulic containers, nozzles, sprinklers, flare nuts, nuts, water supply and hot-water supply facilities, air-conditioning facilities, containers, connection tools and devices for fire protection facilities and gas facilities, containers and devices through which water, warm water, coolants, air, city gas and propane gas pass.

25. A hot-forged copper alloy part which has a tubular shape, wherein an alloy composition contains 73.0 mass % to 84.0 mass % of Cu, 0.003 mass % to 0.3 mass % of Pb and 2.5 mass % to 4.5 mass % of Si with a remainder of Zn and inevitable impurities, a content of Cu [Cu] mass %, a content of Pb [Pb] mass % and a content of Si [Si] mass % have a relationship of $59 \leq ([Cu]+0.5\times[Pb]-4.5\times[Si]) \leq 64$, a shape of the forged part satisfies a formula of $0.4 \leq$ (average inner diameter)/(average outer diameter) $\leq 0.92$, $0.04 \leq$ (average thickness)/(average outer diameter) $\leq 0.3$, and $1 \leq$ (tube axis direction length)/(average thickness) $\leq 10$, and a forging material which is to be hot-forged has a tubular shape and satisfies $0.3 \leq$ (average inner diameter/average outer diameter) $\leq 0.88$, $0.06 \leq$ (average thickness)/(average outer diameter) $\leq 0.35$, and $0.8 \leq$ (tube axis direction length)/(average thickness) $\leq 12$, and $0\% \leq$ (degree of uneven thickness) $\leq 30\%$, $0 \leq$ (degree of uneven thickness) $\leq 75 \times 1/((\text{tube axis direction length})/(\text{average thickness}))^{1/2}$ in any location in a tube axis direction.

26. The hot-forged copper alloy part according to claim 25, wherein the hot-forged copper alloy part further contains at least one of 0.01 mass % to 0.3 mass % of As, 0.01 mass % to 0.3 mass % of Sb, 0.01 mass % to 0.3 mass % of P, 0.01 mass % to 0.3 mass % of Mg, 0.01 mass % to 1.5 mass % of Sn, 0.01 mass % to 1.0 mass % of Al, 0.01 mass % to 4.0 mass % of Mn, 0.01 mass % to 4.0 mass % of Ni, 0.0005 mass % to 0.05 mass % of Zr, 0.0005 mass % to 0.05 mass % of B and 0.003 mass % to 0.3 mass % of Bi, and a content of Cu [Cu] mass %, a content of Pb [Pb] mass %, a content of Si [Si] mass %, a content of Ni [Ni] mass %, a content of Mn [Mn] mass %, a content of As [As] mass %, a content of Zr [Zr] mass %, a content of B [B] mass %, a content of Bi [Bi] mass %, a content of Sb [Sb] mass %, a content of Sn [Sn] mass %, a content of Mg [Mg] mass %, a content of Al [Al] mass % and a content of P [P] mass % have a relationship of $59 \leq ([Cu]+0.5\times[Pb]-4.5\times[Si]+2.2\times[Ni]+1.4\times[Mn]+0.5\times([As]+[Zr]+[B]+[Bi])-1.2\times([Sb]+[Sn]+[Mg])-2.2\times[Al]-3\times[P]) \leq 64$.

27. The hot-forged copper alloy part according to claim 25, wherein, in a metal structure at room temperature after the hot forging, an area ratio of α phase is in a range of 30% to 100%, and a sum of an area ratio of β phase, an area ratio of γ phase and an area ratio of μ phase is in a range of 0% to 25%.

28. The hot-forged copper alloy part according to claim 25, wherein the tubular hot-forged copper alloy part is manufactured by heating the forging material to a hot forging temperature so as to be hot-forged, and the hot forging temperature is in a range of 650° C. to 800° C., and the area ratio of the α phase in the metal structure of the forging material at the hot forging temperature is in a range of 3% to 60%.

29. The hot-forged copper alloy part according to claim 25, wherein, when the forging material is heated at 720° C., the area ratio of the α phase in the metal structure is in a range of 3% to 60%.

30. The hot-forged copper alloy part according to claim 25, wherein the forging material is a continuous cast tube.

31. The hot-forged copper alloy part according to claim 25, wherein the hot-forged copper alloy part is used for valves, ball valves, joints, joints and connection tools for crosslinked polyethylene tubes, tube joints and connection tools for crosslinked polybutene tubes, connection tools for water supply and drainage, hose nipples, connection tools for gardening hoses, connection tools for gas hoses, lids for water meters, water faucets, hydraulic containers, nozzles, sprinklers, flare nuts, nuts, water supply and hot-water supply facilities, air-conditioning facilities, containers, connection tools and devices for fire protection facilities and gas facilities, containers and devices through which water, warm water, coolants, air, city gas and propane gas pass.

32. The hot-forged copper alloy part according to claim 26, wherein, in a metal structure at room temperature after the hot forging, an area ratio of α phase is in a range of 30% to 100%, and a sum of an area ratio of β phase, an area ratio of γ phase and an area ratio of μ phase is in a range of 0% to 25%.

33. The hot-forged copper alloy part according to claim 26, wherein the tubular hot-forged copper alloy part is manufactured by heating the forging material to a hot forging temperature so as to be hot-forged, and the hot forging temperature is in a range of 650° C. to 800° C., and the area ratio of the α phase in the metal structure of the forging material at the hot forging temperature is in a range of 3% to 60%.

34. The hot-forged copper alloy part according to claim 26, wherein, when the forging material is heated at 720° C., the area ratio of the α phase in the metal structure is in a range of 3% to 60%.

35. The hot-forged copper alloy part according to claim 26, wherein the forging material is a continuous cast tube.

36. The hot-forged copper alloy part according to claim 26, wherein the hot-forged copper alloy part is used for valves, ball valves, joints, joints and connection tools for crosslinked polyethylene tubes, tube joints and connection tools for crosslinked polybutene tubes, connection tools for water supply and drainage, hose nipples, connection tools for gardening hoses, connection tools for gas hoses, lids for water meters, water faucets, hydraulic containers, nozzles, sprinklers, flare nuts, nuts, water supply and hot-water supply facilities, air-conditioning facilities, containers, connection tools and devices for fire protection facilities and gas facilities, containers and devices through which water, warm water, coolants, air, city gas and propane gas pass.

* * * * *